(12) United States Patent
Li et al.

(10) Patent No.: US 11,658,726 B2
(45) Date of Patent: May 23, 2023

(54) BEAM TRACKING USING DOWNLINK DATA RECEPTION AND MOTION SENSING INFORMATION

(71) Applicant: Apple Inc., Cupertino, CA (US)

(72) Inventors: Yang Li, Plano, TX (US); Zhu Ji, San Jose, CA (US); Johnson O. Sebeni, Fremont, CA (US); Ping Wang, San Jose, CA (US); Haitong Sun, Irvine, CA (US); Pengkai Zhao, San Jose, CA (US); Sulabh Khandelwal, San Jose, CA (US); Jia Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 129 days.

(21) Appl. No.: 16/865,827

(22) Filed: May 4, 2020

(65) Prior Publication Data
US 2020/0358515 A1 Nov. 12, 2020

Related U.S. Application Data

(60) Provisional application No. 62/845,188, filed on May 8, 2019.

(51) Int. Cl.
*H04B 7/08* (2006.01)
*H04B 7/06* (2006.01)
(Continued)

(52) U.S. Cl.
CPC ............. *H04B 7/088* (2013.01); *G01S 19/26* (2013.01); *H04B 7/0617* (2013.01);
(Continued)

(58) Field of Classification Search
CPC .... H04B 7/088; H04B 7/0617; H04B 7/0695; H04B 17/318; G01S 19/26; H04L 5/005;
(Continued)

(56) References Cited

U.S. PATENT DOCUMENTS

| 7,522,095 B1 | 4/2009 | Wasiewicz |
|---|---|---|
| 10,181,891 B2 | 1/2019 | Islam et al. |

(Continued)

FOREIGN PATENT DOCUMENTS

| CN | 103814529 | 5/2014 |
|---|---|---|
| CN | 107652220 | 3/2018 |

(Continued)

OTHER PUBLICATIONS

Office Action for Korean Patent Application No. 10-2021-0144388; dated Mar. 1, 2023.

*Primary Examiner* — Ajit Patel
*Assistant Examiner* — Wilfred Thomas
(74) *Attorney, Agent, or Firm* — Kowert, Hood, Munyon, Rankin & Goetzel, P.C.

(57) ABSTRACT

This disclosure relates to performing receive beam tracking using motion sensing information in a cellular communication system. A wireless device and a cellular base station may establish a cellular link. A receive beam configuration may be selected for the cellular link. A downlink data beam may be received using the selected receive beam configuration. A possible modification to the receive beam configuration may be selected based at least in part on motion sensing information for the wireless device. It may be determined whether the possible modification to the receive beam configuration improves downlink data beam reception. It may be determined whether to modify the receive beam configuration for the cellular link in accordance with the possible modification to the receive beam configuration, for example based on whether the possible modification to the receive beam configuration improves downlink data beam reception.

20 Claims, 29 Drawing Sheets

(51) Int. Cl.
*G01S 19/26* (2010.01)
*H04B 17/318* (2015.01)
*H04L 5/00* (2006.01)
*H04W 16/28* (2009.01)

(52) U.S. Cl.
CPC ......... *H04B 7/0695* (2013.01); *H04B 17/318* (2015.01); *H04L 5/005* (2013.01); *H04W 16/28* (2013.01)

(58) Field of Classification Search
CPC .... H04L 5/0053; H04L 5/0023; H04W 16/28; H04W 72/046; H04W 72/085; H04W 76/10
See application file for complete search history.

(56) References Cited

U.S. PATENT DOCUMENTS

| | | | | |
|---|---|---|---|---|
| 11,122,544 | B2* | 9/2021 | Osawa | H04B 7/0404 |
| 2002/0137538 | A1* | 9/2002 | Chen | H04B 7/0491 |
| | | | | 455/575.7 |
| 2012/0064841 | A1* | 3/2012 | Husted | H01Q 1/2291 |
| | | | | 455/78 |
| 2013/0278464 | A1* | 10/2013 | Xia | H01Q 3/36 |
| | | | | 342/430 |
| 2015/0185002 | A1 | 7/2015 | Yang | |
| 2016/0044462 | A1* | 2/2016 | Li | H04W 4/023 |
| | | | | 455/456.3 |
| 2016/0337056 | A1* | 11/2016 | Frenne | H04B 7/0413 |
| 2017/0346545 | A1* | 11/2017 | Islam | H04B 7/0814 |
| 2017/0373740 | A1 | 12/2017 | Guo | |
| 2018/0020407 | A1* | 1/2018 | Emmanuel | H04N 5/23203 |
| 2018/0132116 | A1* | 5/2018 | Shekhar | H01Q 1/273 |
| 2018/0159607 | A1* | 6/2018 | Rybakowski | H04B 7/0617 |
| 2018/0191422 | A1* | 7/2018 | Xia | H04B 7/061 |
| 2019/0044610 | A1* | 2/2019 | Peitzer | H04B 17/318 |
| 2019/0081688 | A1* | 3/2019 | Deenoo | H04B 7/088 |
| 2019/0103908 | A1 | 4/2019 | Yu et al. | |
| 2019/0132066 | A1* | 5/2019 | Park | H04W 36/00835 |
| 2019/0174346 | A1* | 6/2019 | Murray | H04W 24/10 |
| 2019/0215117 | A1* | 7/2019 | Lee | H04L 5/0051 |
| 2019/0253900 | A1* | 8/2019 | Narasimha | H04W 4/025 |
| 2019/0372652 | A1* | 12/2019 | Sadiq | G01S 5/10 |
| 2020/0059889 | A1* | 2/2020 | Kato | H04B 7/088 |
| 2020/0068462 | A1* | 2/2020 | Zetterberg | H04W 72/046 |
| 2020/0274590 | A1* | 8/2020 | Martin | H04B 7/0617 |
| 2020/0275426 | A1* | 8/2020 | Silverman | H04W 72/042 |
| 2021/0204346 | A1* | 7/2021 | Ye | H04B 7/00 |
| 2022/0038192 | A1* | 2/2022 | Goto | H04W 24/10 |

FOREIGN PATENT DOCUMENTS

| | | |
|---|---|---|
| WO | 2018031908 A1 | 2/2018 |
| WO | 2018085601 | 5/2018 |
| WO | 2018204255 | 11/2018 |

\* cited by examiner

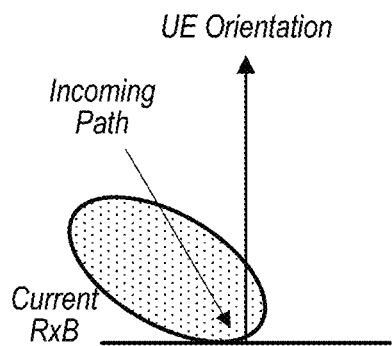
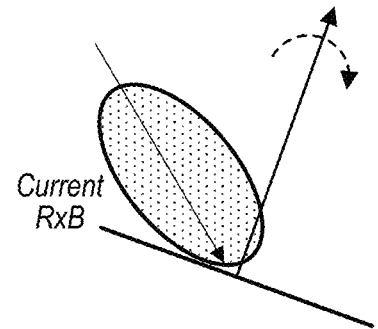
FIG. 14A
FIG. 14B
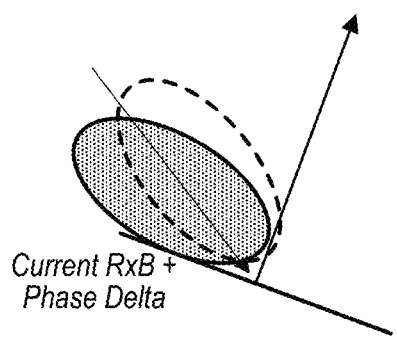
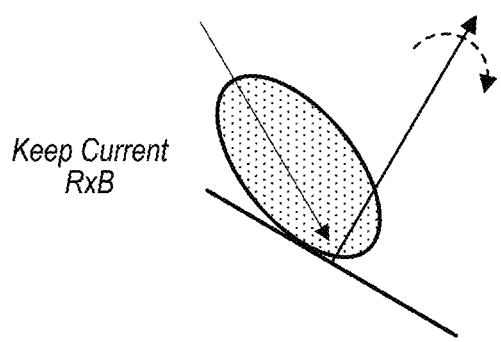
FIG. 14C
FIG. 14D
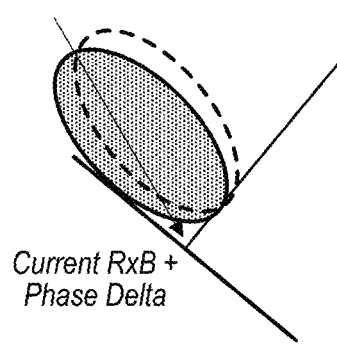
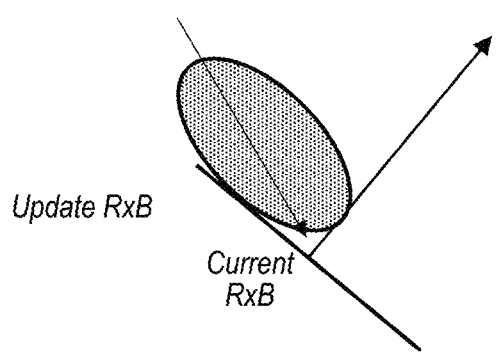
FIG. 14E
FIG. 14F

| Beam DB | | Orientation Range 1 | | | Orientation Range 2 | | | |
|---|---|---|---|---|---|---|---|---|
| RS / RxB | (1, 1, 1) | (1, 1, 2) | (1, 1, 3) | (1, 1, 4) | (1, 1, 1) | (1, 1, 2) | (1, 1, 3) | (1, 1, 4) |
| SRI1 | | | -120 | | | | -110 | |
| SRI2 | | -60 | | | | | | |
| CRI1 | | | | | | -80 | | |
| CRI2 | | | -70 | | | | -70 | |
| CRI3 | | | | -80 | | | | -90 |

FIG. 32

BEAM TRACKING USING DOWNLINK DATA RECEPTION AND MOTION SENSING INFORMATION

PRIORITY INFORMATION

This application claims priority to U.S. provisional patent application Ser. No. 62/845,188, entitled "Beam Tracking Using Downlink Data Reception and Motion Sensing Information," filed May 8, 2019, which is hereby incorporated by reference in its entirety as though fully and completely set forth herein.

FIELD

The present application relates to wireless communications, and more particularly to systems, apparatuses, and methods for performing beam tracking using downlink data reception and/or motion sensing information in a cellular communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. Accordingly, improvements in the field are desired.

For example, some cellular communication systems include the use of beamforming techniques. In such circumstances, a transmit beam configuration may be used to effectively increase the signal strength of a transmitted signal in a targeted direction or area, and/or a receive beam configuration may be used to effectively increase the signal strength of a signal at a receiver by orienting and powering a receive antenna array in accordance with a direction from which the signal is received. Accordingly, beam tracking may be an important aspect of cellular communication, and improvements in the field are desired.

SUMMARY

Embodiments are presented herein of apparatuses, systems, and methods for performing beam tracking using downlink data reception and/or motion sensing information in a cellular communication system.

According to the techniques described herein, a wireless device may use downlink data to assist with performing beam tracking. As one possibility, this may include determining a possible adjustment or modification to the receive beam in use by the wireless device, and determining whether the possible adjustment or modification to the receive beam in use by the wireless device would result in improved performance. To determine whether the possible adjustment or modification to the receive beam in use by the wireless device would result in improved performance, the possible modification to the receive beam may be applied when receiving a downlink data beam and one or more metrics relating to reception performance may be compared for the original receive beam and modified receive beam, at least according to some embodiments. Such an approach may reduce the reliance of the wireless device on reference signals to perform beam tracking, at least in some instances, for example since the downlink data beam itself may be used to help maintain the beam tracking.

At least in some instances, motion sensing information may also be used to assist with performing beam tracking. As one possibility, this may include estimating rotation of the wireless device, and determining the possible adjustment or modification to the receive beam in use by the wireless device based on the estimated rotation of the wireless device. As another possibility, motion sensing information may be used to determine when to check whether a possible adjustment or modification to the receive beam in use by the wireless device would result in improved performance.

Additionally, techniques are described herein for maintaining multiple beam measurement tables associated with different possible orientation ranges of a wireless device. This may be useful to reduce the chance of misalignment of the receive beam of the wireless device that could result from using measurement results associated with an orientation range that is different from the current orientation range of the wireless device when selecting receive beam search candidates.

Still further, techniques are described herein for performing an orientation/posture prioritized beam search. According to such techniques, a wireless device may be able to determine which of its antenna panels are currently associated with the azimuth domain and which are currently associated with the elevation domain. This may in turn allow the wireless device to prioritize the azimuth panels over the elevation panels (or vice versa) when performing a beam search, e.g., depending on the relative priority of the azimuth and elevation domains for the beam search being performed.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIGS. 14A-14F illustrate aspects of an example scenario in which a wireless device performing motion sensing information assisted beam tracking is rotated while receiving wireless signals, according to some embodiments;

FIGS. 31-34 illustrate aspects of an exemplary possible technique for maintaining an orientation indexed beam database, according to some embodiments.

Figure 1:
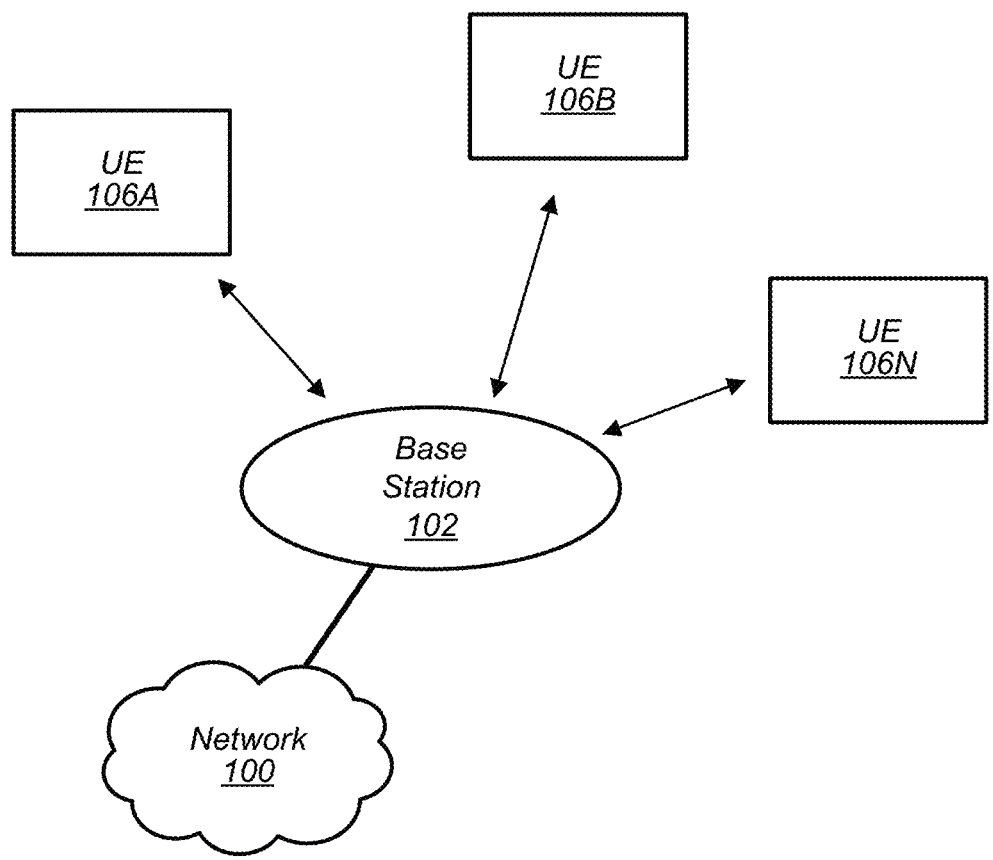
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
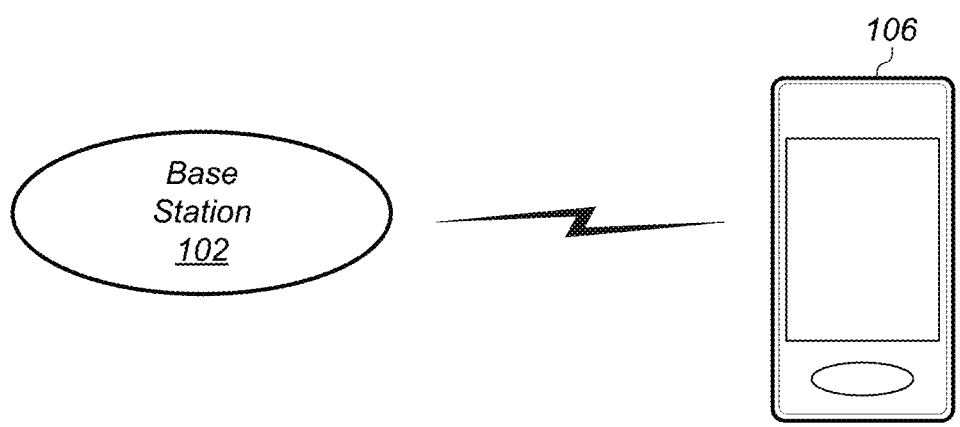
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform beam tracking using downlink data reception and/or motion sensing information such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications.

In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH'. Other configurations are also possible.

Figure 3:
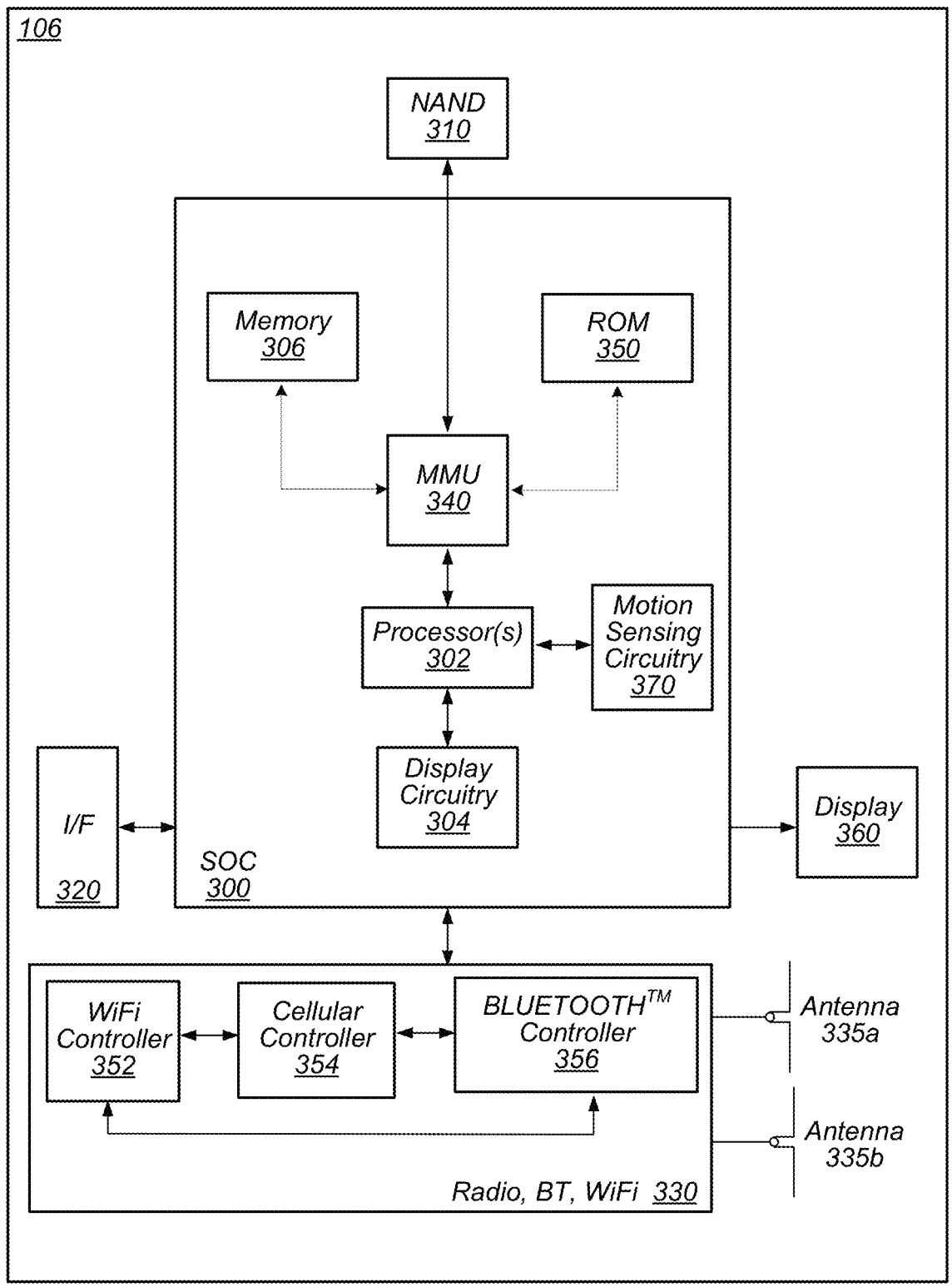
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform receive beam tracking using using downlink data reception and/or motion sensing information such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform receive beam tracking using using downlink data reception and/or motion sensing information according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
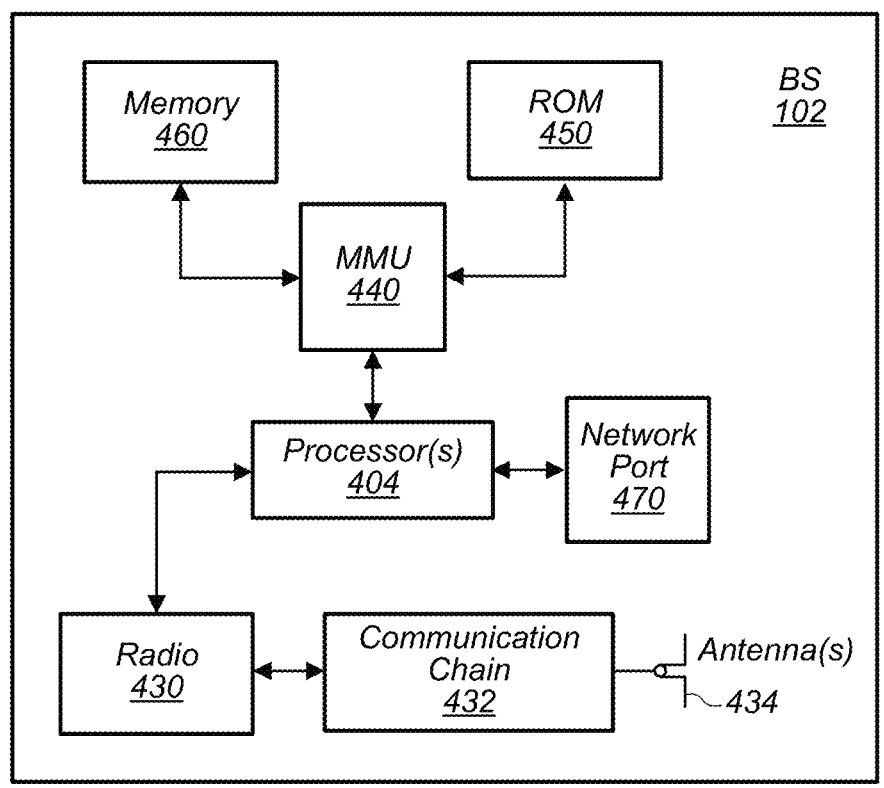
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A, WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard.

Figure 5:
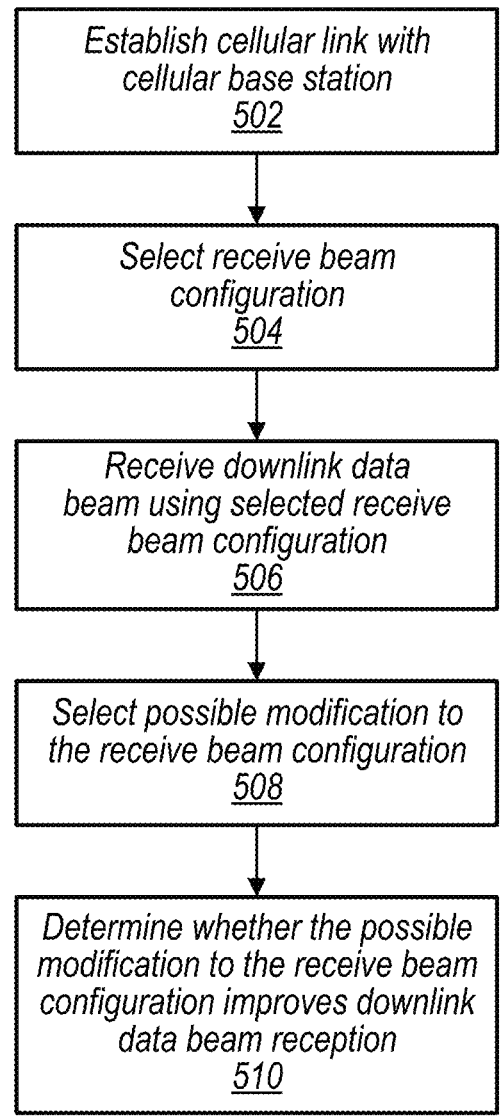
FIG. 5 is a flowchart diagram illustrating aspects of an exemplary possible method for performing beam tracking using motion sensing information in a cellular communication system, according to some embodiments.

FIG. 5—Receive Beam Tracking Using Downlink Data Reception

Some wireless communication techniques may utilize beamforming for at least some communications. Such techniques may reduce the power requirements and/or increase the effective communication range for wireless communications in a specific direction or area. However, due to mobility, changing medium conditions, and/or for any of a variety of other reasons, it can sometimes occur that a beam configuration can become less effective than an alternate beam configuration, or even fail altogether, which can lead to reduced signal strength, or even service interruption or loss. Accordingly, beam tracking may be an important aspect of wireless communication that utilizes beamforming techniques.

FIG. 5 is a communication flow diagram illustrating a method for a wireless device (e.g., a wireless user equipment (UE) device, as one possibility) to perform receive beam tracking using downlink data reception in a cellular communication system, according to some embodiments.

Aspects of the method of FIG. 5 may be implemented by a wireless device and a cellular base station, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with LTE, LTE-A, NR, and/or 3GPP specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, a wireless device may establish a wireless link with a cellular base station. According to some embodiments, the wireless link may include a cellular link according to 5G NR. For example, the wireless device may establish a session with an AMF entity of the cellular network by way of a gNB that provides radio access to the cellular network. Other types of cellular links are also possible, and the cellular network may also or alternatively operate according to another cellular communication technology (e.g., LTE, UMTS, CDMA2000, GSM, etc.), according to various embodiments.

Establishing the wireless link may include establishing a RRC connection with a serving cellular base station, at least according to some embodiments. Establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state.

As part of establishing the RRC connection and/or in one or more other ways (e.g., via broadcast system information, via media access control (MAC) control elements, etc.), the base station and the wireless device may determine and/or exchange beam configuration information. The beam configuration information may include any of various information for supporting beam use between the cellular base station and the wireless device. As one possibility, the beam configuration information may indicate one or more active transmit beams (e.g., an active beam set) for downlink communications from the cellular base station. The beam configuration information may also indicate one or more other configured (but not active) transmit beams, e.g., that the wireless device may be able to (and may be expected to, at least in some instances) monitor (e.g., using reference symbols associated with those configured beams that are provided by the cellular base station). Beam configuration may also include selection of a receive beam configuration by the wireless device.

Accordingly, in 504, the wireless device may select a first receive beam configuration for the cellular link. In some instances, beam alignment and selection may be performed using any or all of multiple possible procedures. For example, a P1 procedure may be used for coarse transmit and receive beam alignment, as one possibility. Such a procedure may include the cellular base station beam sweeping synchronization signal blocks (SSBs) while the wireless device performs and reports measurements of the received signal strength, which may assist both the cellular base station to select a transmit beam configuration and the wireless device to select a receive beam configuration. Such beam alignment and selection may be considered relatively coarse because the SSBs may have a relatively wide beamwidth, e.g., as compared to a data beam and/or at least some other reference signals, according to some embodiments.

As another example, a P3 procedure may be used, e.g., to refine receive beam selection. Such a procedure may include the cellular base station providing channel state information reference signals (CSI-RS) or other reference signals (e.g., which may have a more narrow beam relative to the SSBs) using a selected transmit beam configuration while the wireless device can perform receive beam sweeping to help refine its receive beam configuration. Thus, at least according to some embodiments, the receive beam configuration may be selected based on one or more reference signals from the cellular base station, for example using a P1 and/or P3 procedure. Other procedures that utilize reference signals to determine transmit and/or receive beam configuration, or variations on such procedures, are also possible. Note that, at least in some instances (e.g., initial beam selection, as one possibility), the receive beam selection may be performed without use of motion sensing information for the wireless device.

In 506, the wireless device may receive downlink data using the first receive beam configuration. The downlink data may be provided on a downlink data channel, such as a physical downlink shared channel (PDSCH), which is beamformed using a transmit beam configuration selected for transmissions to the wireless device by the cellular base station in accordance with the beam configuration selection. Similarly, the wireless device may use the first receive beam configuration to receive the downlink data beam, e.g., in order to orient its reception toward the data beam provided by the cellular base station.

In some instances, it may be the case that receive beam configuration selection using reference signals from the cellular base station results in good performance, e.g., potentially including under rotation and mobility. For example, if the cellular base station provides aperiodic CSI-RS sufficiently frequently and/or the wireless device is experiencing relatively low motion/rotation, it may be the case that the receive beam tracking just using the reference signals provided by the cellular base station may be sufficient for good performance. However, in some instances (e.g., if the cellular base station does not provide P3 CSI-RS, and/or the wireless device is experiencing relatively high motion/rotation, among various possibilities), it may be the case that the receive beam tracking could be improved by potentially using motion sensing information and/or testing possible receive beam modifications using a data beam provided by the cellular base station.

Accordingly, at least according to some embodiments, the wireless device may determine whether the receive beam configuration selection using reference signals from the cellular base station meets one or more receive beam configuration selection conditions, e.g., that may be considered indicative of whether the receive beam configuration selection using the reference signals is providing sufficient performance. For example, one possible receive beam configuration selection condition could include whether receive beam configuration selection using reference signals (e.g., CSI-RS) from the cellular base station results in the same receive beam configuration being selected for at least a certain number of measurements. If so, it may be the case that the receive beam configuration selection using the reference signals is providing sufficient performance. If not, however, it may be the case that using motion sensing information and/or testing possible receive beam modifications using a data beam provided by the cellular base station could improve receive beam tracking performance. Another possible receive beam configuration selection condition could include whether a signal strength value for a synchronization signal differs from (e.g., is greater or lesser than) a signal strength value of a data channel by a certain threshold for a certain number of measurements. If not, it may be the case that the receive beam configuration selection using the reference signals is providing sufficient performance. If so, however, it may be the case that using motion sensing information and/or testing possible receive beam modifications using a data beam provided by the cellular base station could improve receive beam tracking performance.

If the receive beam configuration selection conditions are indicative of insufficient receive beam tracking performance when using reference signals (e.g., without using motion sensing information and/or testing possible receive beam modifications using a data beam), the wireless device may determine to enable one or more possible triggers determine whether to modify the receive beam configuration for the cellular link, whether to enable use of downlink data reception for the receive beam configuration selection, and/or to enable use of motion sensing information for the wireless device when selecting possible receive beam configuration modifications.

The triggering conditions could include detection of an amount of rotation of the wireless device that is greater than a configured rotation threshold, detection of an amount of time greater than a configured time threshold having elapsed since a previous determination of whether to modify the receive beam configuration, and/or any of various other possible triggering conditions. The triggering conditions (e.g., the rotation threshold, the time threshold, etc.) may be selected based on any of various possible considerations, such as motion status of the wireless device, multipath conditions at the wireless device, receive beam codebook spatial granularity for the wireless device, and/or any of a variety of other possible considerations. Note that the triggering conditions may be re-evaluated if one or more of the considerations based on which they were determined changes; for example, if the multipath environment of the wireless device changes, it may be the case that a new rotation threshold is selected and/or a new time threshold is selected based on the new multipath environment.

In 508, the wireless device may select a possible modification to the receive beam configuration. At least according to some embodiments, selection of the possible modification to the receive beam configuration may be performed based at least in part on detection of a configured triggering condition to determine whether to modify the receive beam configuration for the cellular link. For example, the wireless device may detect that the wireless device has rotated beyond the rotation threshold configured to trigger selection of a possible modification to the receive beam, or the wireless device may detect that an amount of time has elapsed since a previous selection of a possible modification to the receive beam that is greater than the time threshold configured to trigger selection of a possible modification to the receive beam.

In some instances, the possible modification to the receive beam configuration may be based on motion sensing information for the wireless device. The motion sensing information may include information related to rotation of the wireless device; for example, the wireless device may include motion sensing circuitry capable of detecting and measuring rotation of the wireless device, such that the motion sensing information may include an estimated amount and/or direction of rotation of the wireless device relative to a previous position of the wireless device. Rotation of the wireless device may impact the effectiveness of the receive beam configuration, e.g., depending on how much rotation has occurred, such that it may be the case that a modification to the receive beam configuration could improve reception of the downlink data beam.

The amount and type of modification to the receive beam configuration may depend on the amount and direction of rotation, and possibly also on the spatial granularity of the receive beam codebook used by the wireless device. For example, the possible modification may include a perturbation of a current receive beam configuration that remains within the same receive beam code word as the first receive beam configuration, such as a rotation by 45 degrees of one or two antenna elements of the wireless device, as one possibility, e.g., if the amount of rotation is relatively small and/or the receive beam codebook is relatively sparse. As another possibility, the possible modification may include selecting a different a receive beam code word than the first receive beam configuration, e.g., if the amount of rotation is relatively large and/or the receive beam codebook is relatively dense.

Note that while estimated rotation and/or other motion sensing information may be one possible basis for selecting one or more candidates for modification to the receive beam configuration, any number of other approaches may additionally or alternatively be used, as desired.

In 510, the wireless device may determine whether the possible modification to the receive beam configuration improves downlink data beam reception. This may include testing the possible modification to the receive beam configuration using the downlink data beam, at least in some instances. For example, the wireless device may receive the downlink data beam using a ("second") receive beam configuration as modified by the possible modification for a configured duration (e.g., one or more slots according to the cellular link with the cellular base station), and may determine signal strength, signal to noise ratio, and/or any of various other possible metrics when receiving the downlink data beam using each of the first receive beam configuration and the second receive beam configuration. The determined metric(s) may be compared, and it may be determined that the possible modification to the receive beam configuration improves downlink data beam reception if the metric(s) is (are) better for the second receive beam configuration than for the first receive beam configuration, while it may be determined that the possible modification to the receive beam configuration does not improve downlink data beam reception if the metric(s) is (are) worse for the second receive beam configuration than for the first receive beam configuration.

At least according to some embodiments, the wireless device may determine to not modify the receive beam configuration for the cellular link if it is determined that the possible modification to the receive beam configuration does not improve downlink data beam reception. In this case, the wireless device may subsequently use the first receive beam configuration to receive the downlink data beam. Likewise, the wireless device may determine to modify the receive beam configuration for the cellular link if it is determined that the possible modification to the receive beam configuration improves downlink data beam reception. In this case, the wireless device may subsequently use the second receive beam configuration to receive the downlink data beam.

Note that the wireless device may evaluate whether to modify its receive beam configuration any number of times, e.g., as triggered in accordance with the configured triggers to do so. For example, while configured to do so, the wireless device may evaluate whether to modify its receive beam configuration whenever rotation greater than the configured rotation threshold is detected, and/or whenever a certain amount of time has passed since it has previously evaluated whether to modify its receive beam configuration.

Such evaluations and occasional checking whether possible receive beam configuration modifications would improve data beam reception may result in more accurate receive beam tracking by the wireless device, at least according to some embodiments.

Additionally, it should be noted that under certain circumstances the wireless device may be configured to re-evaluate whether receive beam tracking using just reference signals provides sufficient performance or if motion sensing information assisted selection of possible modifications to the receive beam configuration of the wireless device and/or testing possible receive beam modifications using a data beam provided by the cellular base station could improve receive beam tracking performance. For example, when handover occurs, and/or if a new reference signal configuration has been provided to the wireless device, it is possible that receive beam tracking using just reference signals may become sufficient when it previously was insufficient, or may become insufficient when it previously was sufficient. Accordingly, in such circumstances, it may be the case that the wireless device is configured to again evaluate whether to enable one or more triggers to determine whether to modify the receive beam configuration for the cellular link, whether to enable use of motion sensing information for the wireless device when selecting possible receive beam configuration modifications, and/or whether to use the downlink data beam to determine whether such possible receive beam configuration modifications improve downlink data beam reception. Such evaluation may be performed in a similar manner as previously described, e.g., including determining whether performing receive beam configuration selection using just reference signals meets one or more conditions indicative of good performance, at least as one possibility.

At least according to some embodiments, a motion detection assisted approach to selecting possible receive beam configuration modifications and use of a downlink data beam to check whether such modifications would improve wireless device performance, such as described herein, may help improve receive beam tracking in scenarios in which receive beam refinement opportunities using reference signals are relatively limited. Alternatively, or additionally, such techniques may potentially be used to reduce the number of reference signal measurements needed to obtain good receive beam tracking performance.

FIGS. 6-36—Additional Information

FIGS. 6-36 and the following information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

Figure 6:
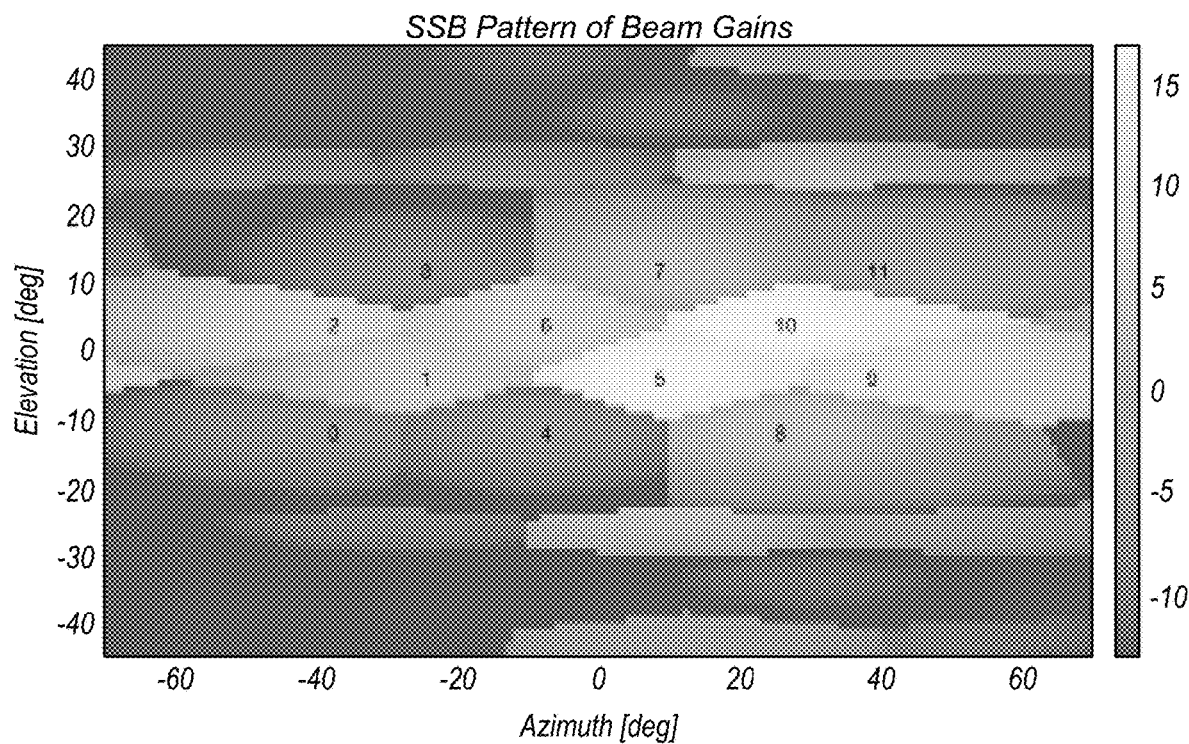
FIGS. 6-7 illustrate patterns of possible beam gains when using synchronization signal blocks and channel state information reference signals for receive beam alignment in an exemplary test scenario, according to some embodiments.
Figure 7:
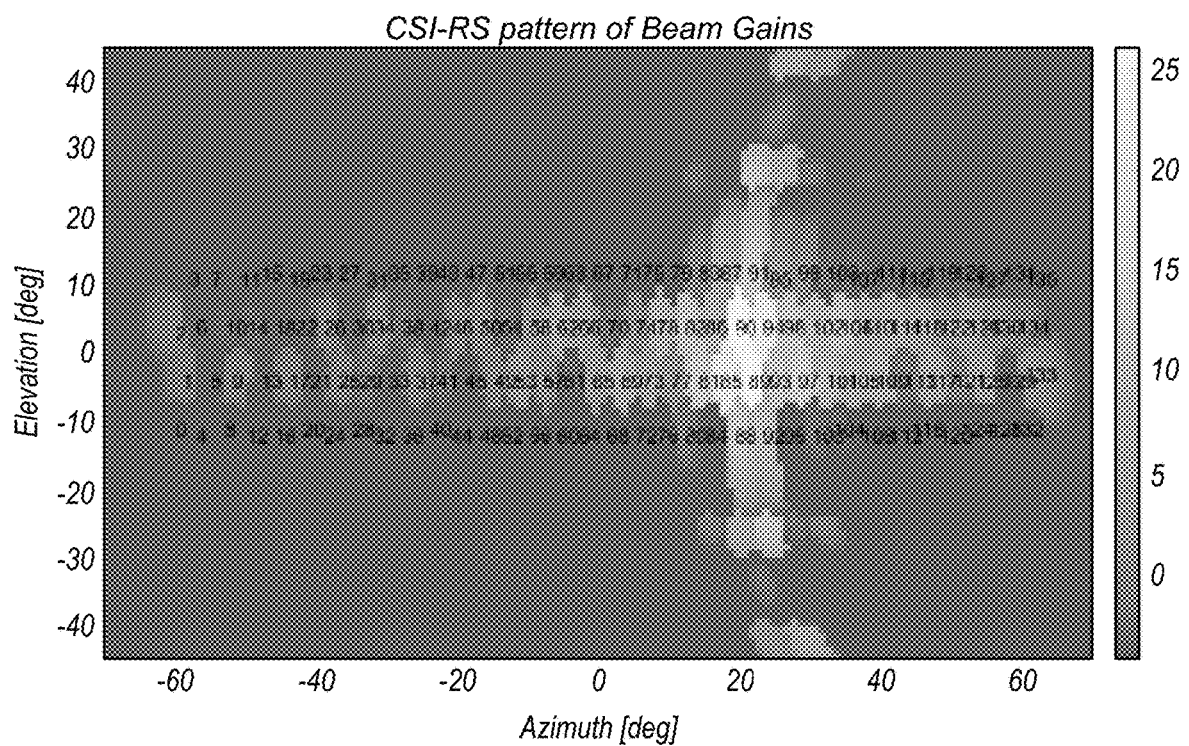
Figure 8:
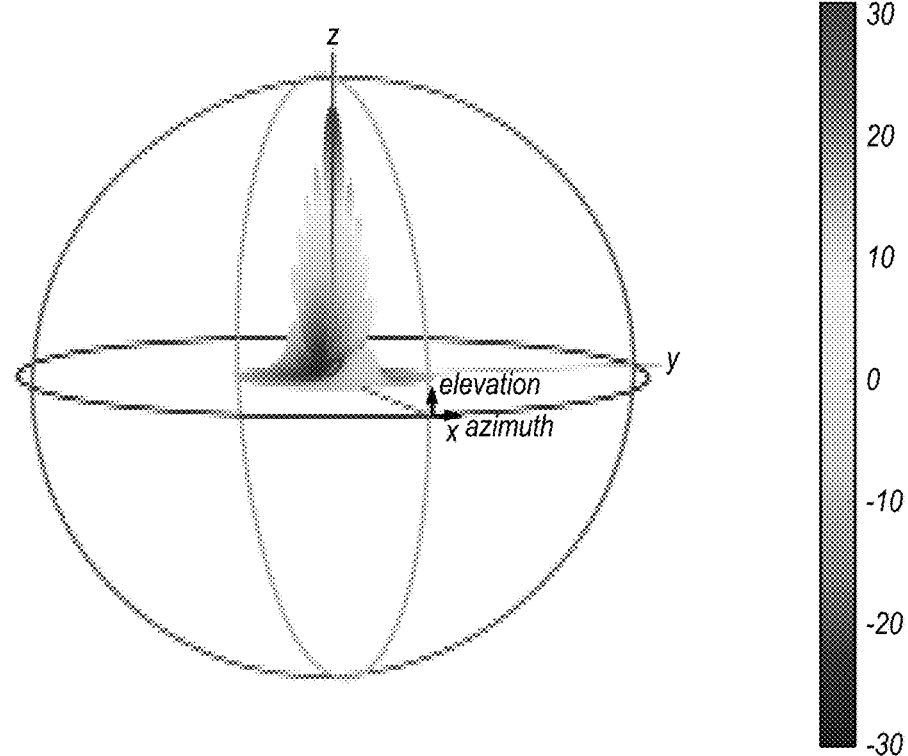
FIGS. 8-9 illustrate exemplary representations of channel state information reference signal beam and a synchronization signal block beam, according to some embodiments.
Figure 9:
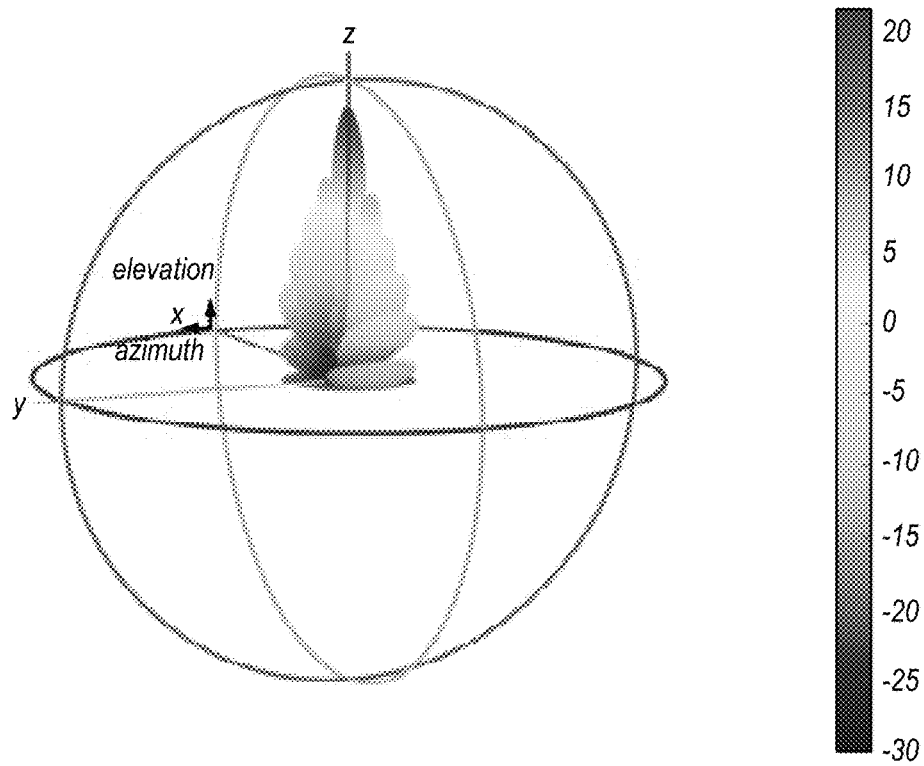
Figure 10:
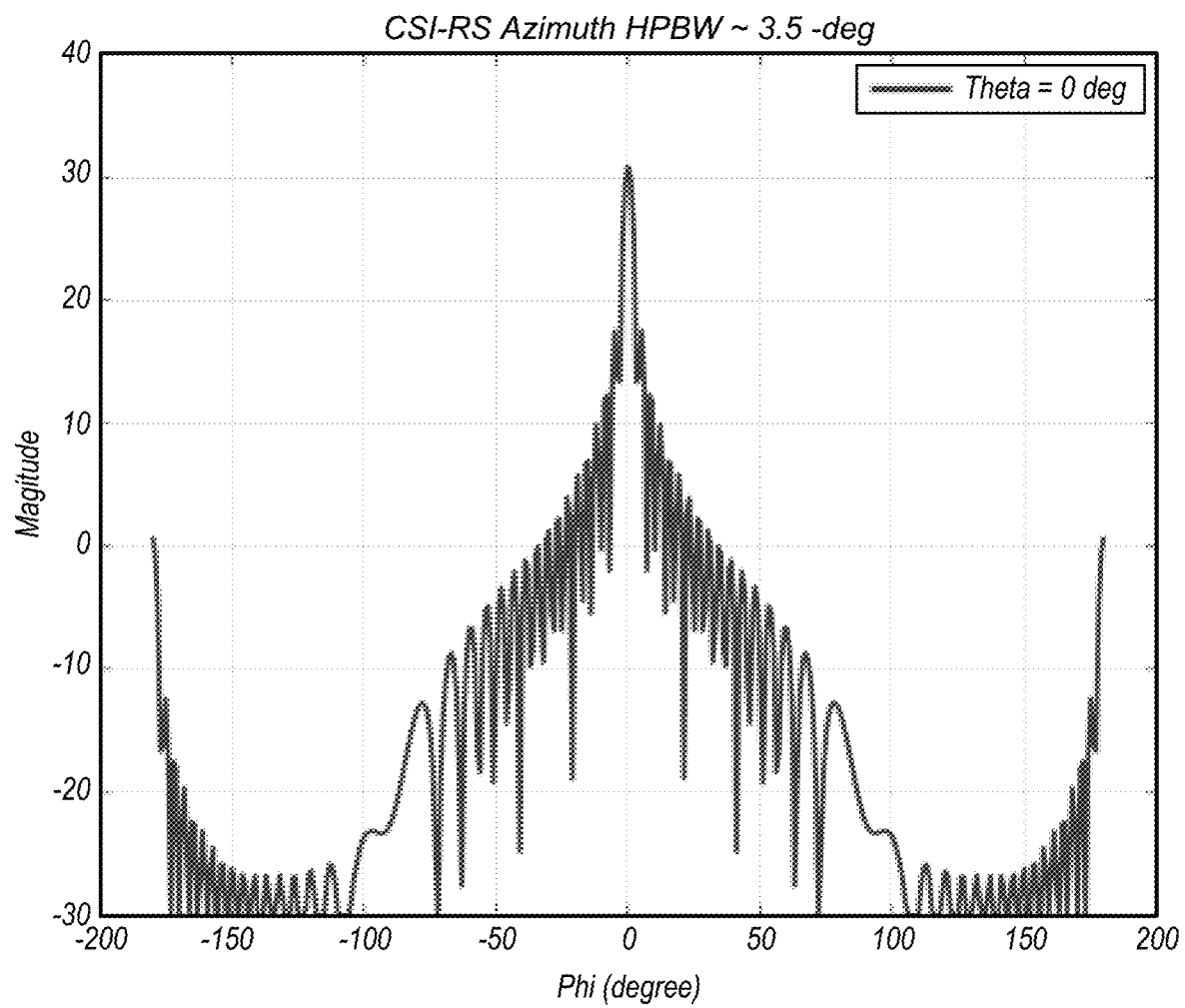
FIG. 10 illustrates aspects of a signal strength pattern for a channel state information reference signal beam in the azimuth, according to some embodiments.
Figure 11:
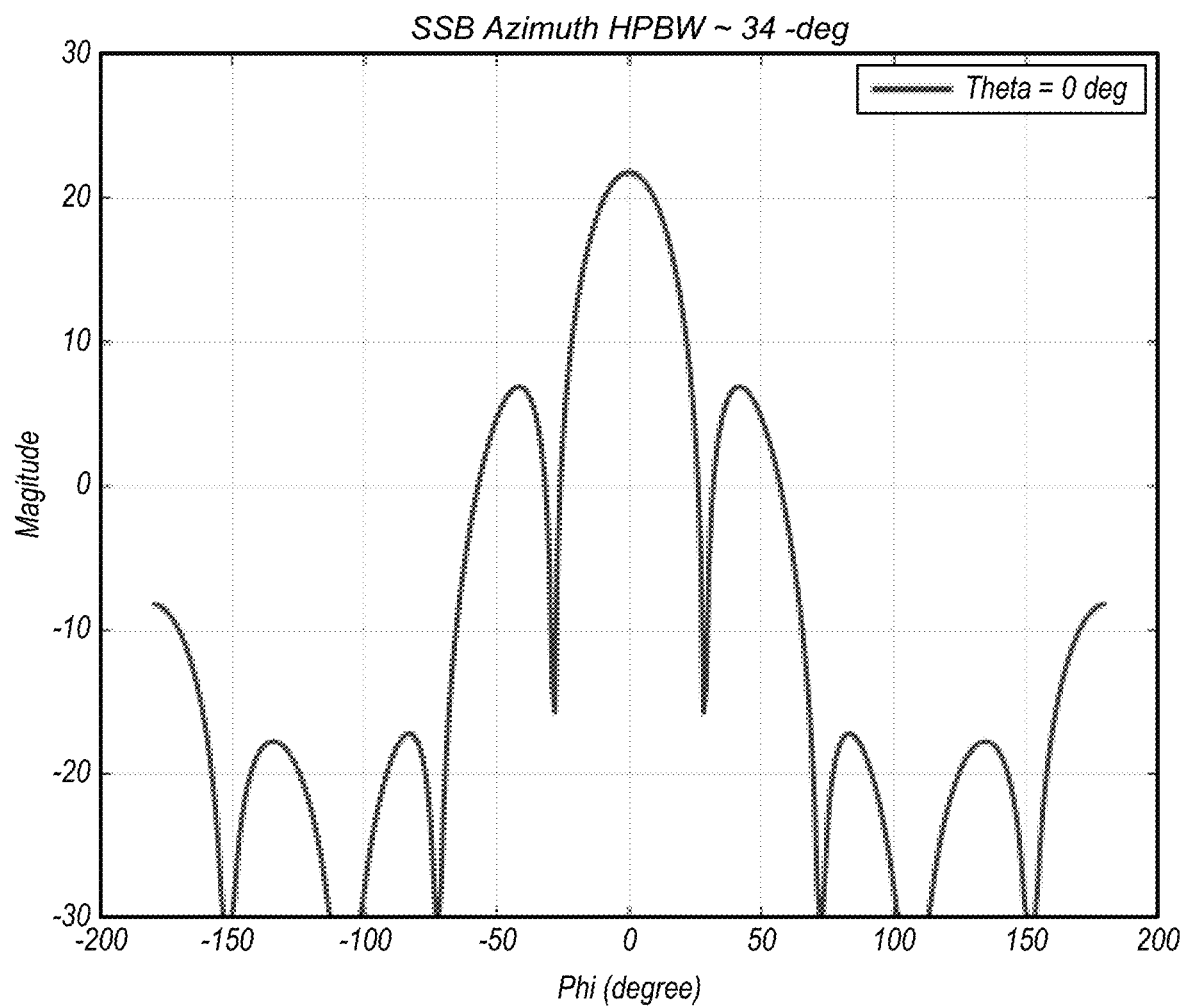
FIG. 11 illustrates aspects of a signal strength pattern for a synchronization signal block beam in the azimuth, according to some embodiments.
Figure 12:
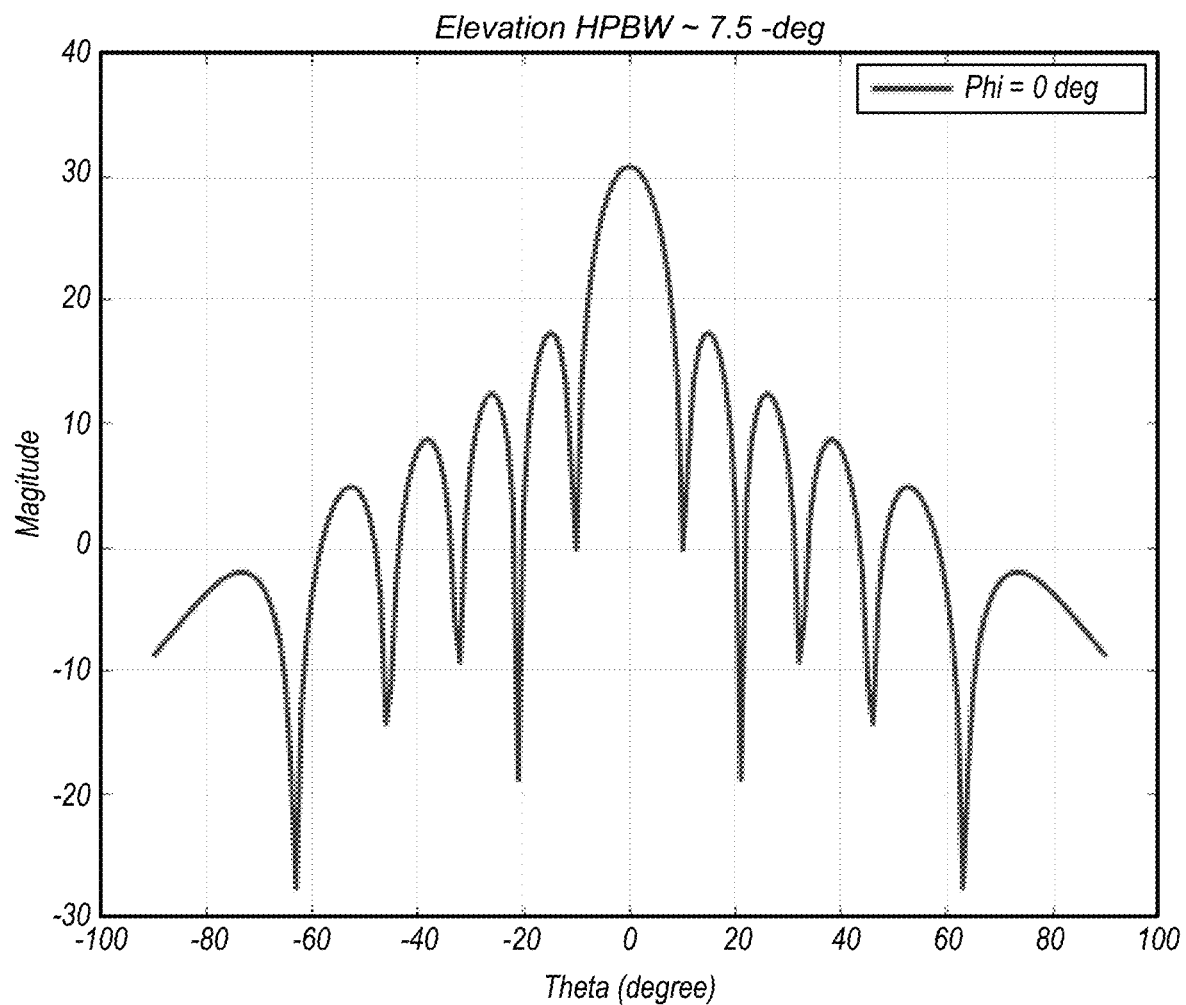
FIG. 12 illustrates aspects of a signal strength pattern for a beam in the elevation, according to some embodiments.

In 3GPP 5G NR, synchronization signal blocks (SSBs) can be used for a P1 procedure and coarse transmit and receive beam alignment. Typically, SSBs have much wider beamwidth, e.g., compared to the physical downlink shared channel (PDSCH) beam, and thus an additional P3 procedure may be used for beam refinement to support PDSCH transmissions. For example, FIGS. 6-7 illustrate patterns of possible beam gains when using synchronization signal blocks and channel state information reference signals, respectively, for receive beam alignment in an exemplary test scenario. FIGS. 8-9 illustrate exemplary representations of a CSI-RS beam and a SSB beam, respectively, according to some embodiments. FIG. 10 illustrates aspects of a signal strength pattern for a CSR-RS beam in the azimuth, according to some embodiments. FIG. 11 illustrates aspects of a signal strength pattern for a SSB beam in the azimuth, according to some embodiments. FIG. 12 illustrates aspects of a signal strength pattern for a beam in the elevation, according to some embodiments. As shown, the CSI-RS beam may be narrower than the SSB beam, and it may be the case that elevation and azimuthal angles for highest beam gains can be selected with a higher degree of precision using the CSI-RS.

However, at least in some instances (e.g., initial deployment, as one possibility), it may be the case that network infrastructure equipment may provide aperiodic CSI-RS for a P3 procedure before initial PDSCH use and may not configure aperiodic CSI-RS afterwards unless UE performance drops. Additionally, it should be noted that performing a P3 procedure may require a certain amount of power consumption by the UE and may interrupt data reception, such that, at least according to some embodiments, it may be beneficial to perform P3 procedures relatively infrequently, e.g., as long as good device performance can still be obtained.

Accordingly, at least in some scenarios, it may be beneficial to introduce one or more techniques that can help improve receive beam tracking performance when reference signal based receive beam refinement (e.g., P3 procedure) opportunities are relatively infrequent, and/or to reduce the number of reference signals needed to obtain good performance (e.g., to reduce the number of receive beam "search hypotheses" and/or improve neighbor beam configuration). Use of rotation information that can be obtained by a UE may represent one such possible technique.

Figure 13:
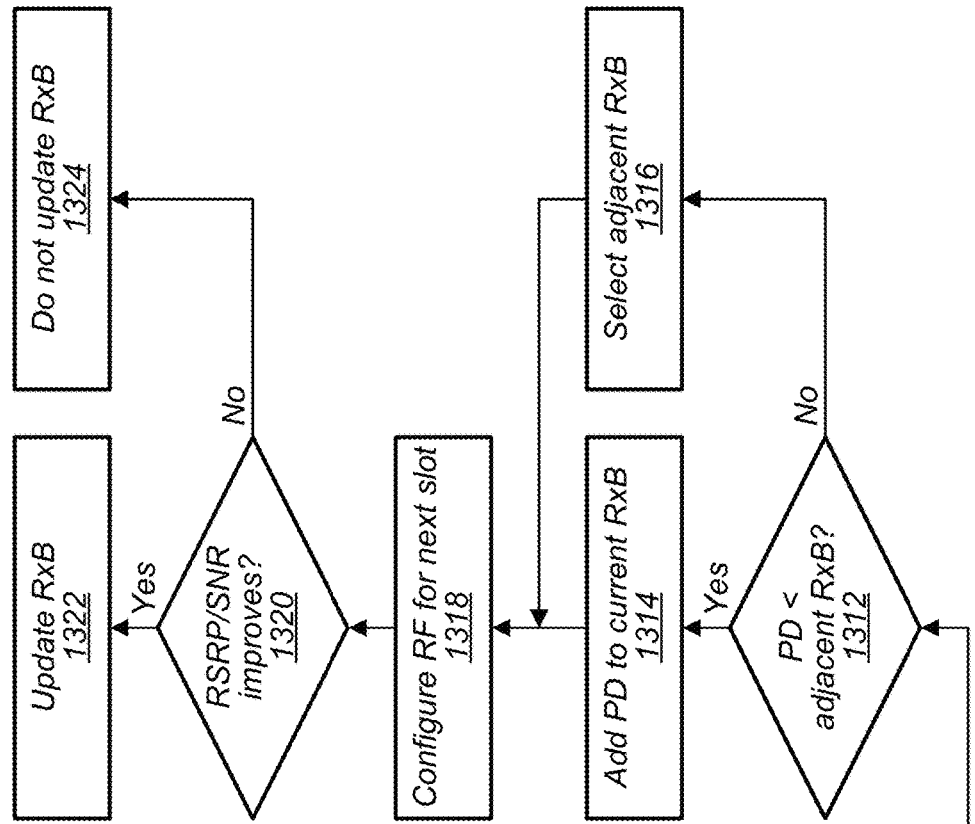
FIG. 13 is a flowchart diagram illustrating aspects of an exemplary possible approach to performing motion sensing information assisted beam tracking, according to some embodiments.
Figure 13:
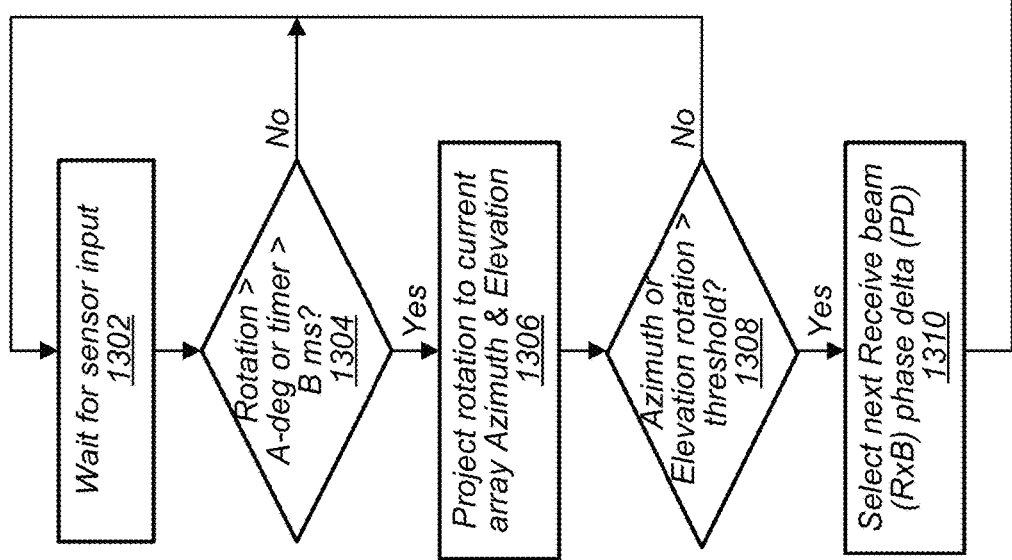

FIG. 13 is a flowchart diagram illustrating aspects of an exemplary possible approach to performing motion sensing information assisted beam tracking, according to some embodiments. Such an approach may include the UE using the downlink data beam to maintain beam tracking during rotation, potentially in a manner that may cause minimal interruption to existing data reception.

As shown, in 1302, the wireless device may initially wait for motion sensor input. In 1304, if sensor input indicating that rotation above a rotation threshold ("A" degrees) has occurred or an amount of time greater than a time threshold ("B" ms) has elapsed, the method may proceed to step 1306, while if rotation is less than the rotation threshold and an amount of time less than the time threshold has elapsed, the wireless device may continue to wait for further sensor input. In 1306 the rotation may be projected to the current array azimuth and elevation, and in 1308 it may be determined if the azimuth or elevation rotation is greater than a certain threshold. If the rotation relative to the current array is less than the threshold, the wireless device may return to waiting for further sensor input. If the rotation relative to a current reference orientation is greater than the threshold, in 1310, the wireless device may select a next receive beam (RxB) phase delta (PD), which may be provided to the beam tracking core of the wireless device. One example of a current reference orientation can be an azimuth and elevation direction in which the current receive beam is measured to attain good performance.

In 1312, the beam tracking core may determine whether the PD is less than the adjacent RxB. If so, 1314, the PD may be added to the current RxB, and if not, in 1316, the adjacent RxB may be selected. In 1318, the RF circuitry of the wireless device may be configured according to the selected RxB. In 1320, it may be determined whether RSRP and/or SNR improves when using the selected RxB. If so, in 1322, the RxB may be updated to keep the modification to the RxB. If not, in 1324, the RxB may not be updated, such that the previous (unmodified) RxB may be used for subsequent data beam reception. Thus, such a technique may allow the wireless device to better align its receive beam to improve performance, and/or to reduce the need for P3 procedures. In some instances, such a technique may also help the wireless device to populate a beam data base (BDB) used by the wireless device.

FIG. 14 illustrates aspects of an example scenario in which a wireless device performing motion sensing information assisted beam tracking is rotated while receiving wireless signals, according to some embodiments. As shown, in FIG. 14A, the wireless device may initially receive a downlink beam at a certain angle and accordingly have a current receive beam configuration. In FIG. 14B, the wireless device may be rotated, such that the alignment of the current receive beam relative to the incoming data beam is modified. In FIG. 14C, a phase delta may be added to the current receive beam configuration as a possible modification, and the modification may be tested on the data beam to determine whether it improves reception. In the illustrated example of FIG. 14C, it does not, so the current receive beam configuration may be kept. In FIG. 14D, the wireless device may be further rotated, which may trigger another determination of whether to modify the receive beam configuration. Accordingly, in FIG. 15E, a phase delta may be added to the current receive beam configuration as a possible modification, and the modification may be tested on the data beam to determine whether it improves reception. In the illustrated example of FIG. 14E, it does, so the receive beam configuration may be updated. As shown in FIG. 14F, the wireless device may subsequently receive the downlink beam using the updated receive beam.

Figure 15:
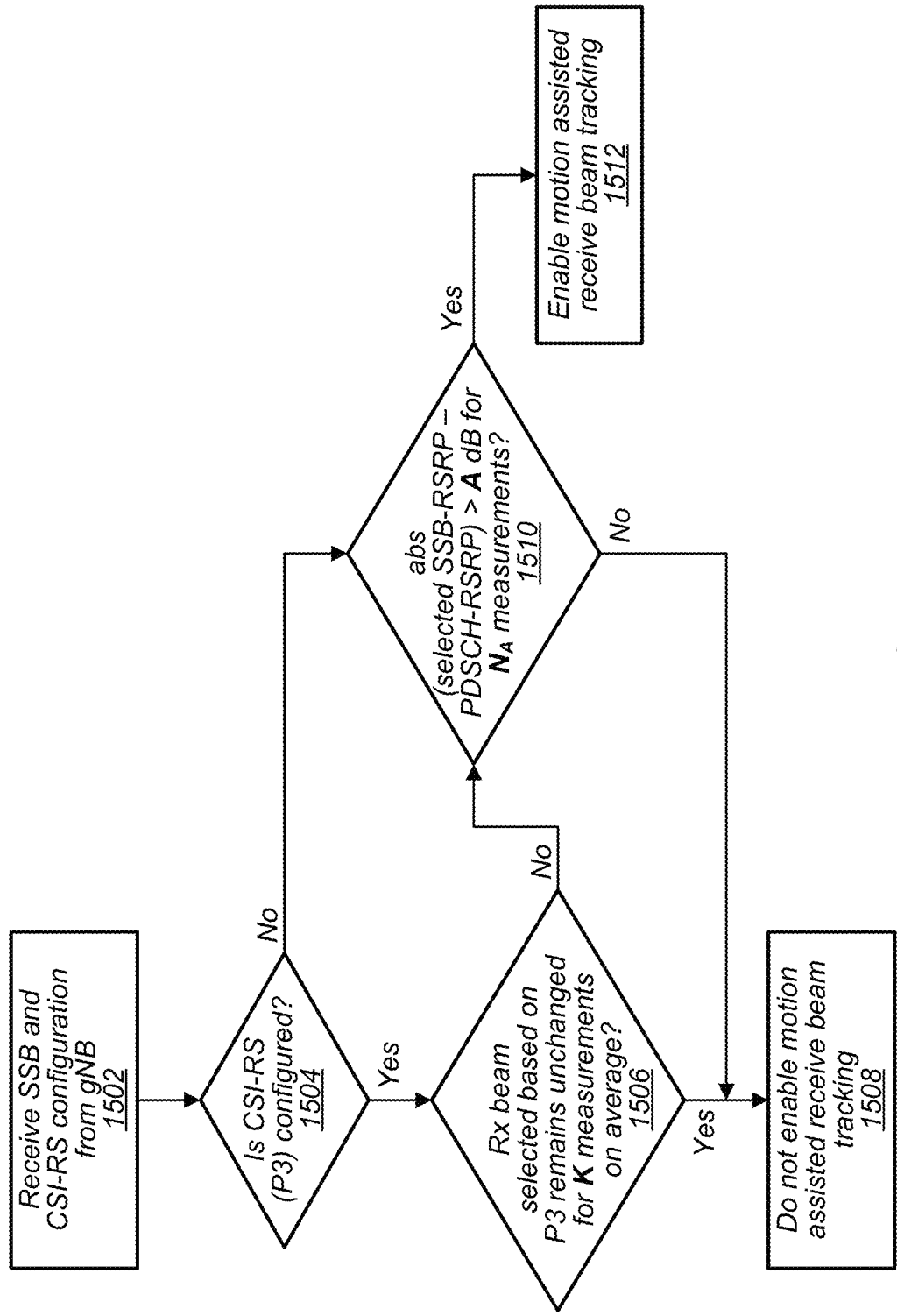
FIG. 15 is a flowchart diagram illustrating aspects of an exemplary possible approach to determining whether to use motion sensing information when performing beam tracking, according to some embodiments.

Such an approach may be useful if reference signal based receive beam configuration selection is not providing sufficiently good performance, but may not be needed if reference signal based receive beam configuration selection is providing sufficiently good performance, at least according to some embodiments. Accordingly, it may be useful to provide a framework for determining the effectiveness of the reference signal based receive beam configuration selection to determine whether to enable use of an approach such as illustrated in FIG. 13 for motion assisted receive beam tracking. FIG. 15 is a flowchart diagram illustrating aspects of one such possible framework.

In 1502, the UE may receive SSB and CSI-RS configuration information from the serving gNB. In 1504, the UE may determine if CSI-RS (e.g., for P3 procedures) are configured (e.g., either periodic or aperiodic). If so, the UE may first evaluate whether the CSI-RS is sufficient to handle motion/rotation, for example based on whether the receive beam changes frequently based on the P3 measurements. For example, if the receive beam does not change often (e.g., remains unchanged for multiple consecutive measurements), this may be indicative that the current P3 configuration is sufficient. Thus, in 1506, the UE may determine whether the receive beam selected based on the P3 procedure remains unchanged for a certain number ("K") of measurements on average. If so, in 1508, the UE may determine to not enable motion assisted or in general "PDSCH-based" receive beam tracking (e.g., the P3 configuration may be providing sufficient receive beam tracking performance). If the receive beam selected based on the P3 procedure does not remain unchanged for K measurements on average, or if CSI-RS are not configured, the UE may further evaluate the effectiveness of the SSB for beam tracking. In this case, the UE may evaluate whether there is a noticeable RSRP difference between the PDSCH and the SSB, as if the difference is relatively minor, this may be indicative that the SSB is sufficiently dense. Accordingly, in 1510, the UE may determine if the absolute value of the RSRP of the selected SSB minus the RSRP of the PDSCH is greater than a certain threshold ("A" dB) for a certain number ("NA") of measurements. If not, the UE may also proceed to step 1508, and may determine to not enable motion assisted receive beam tracking (e.g., receive beam tracking using the SSB may be providing sufficient receive beam tracking performance). If so, in 1512, the UE may determine to enable motion assisted receive beam tracking. In this scenario, it may be the case that receive beam tracking using the CSI-RS and/or SSB may not be providing sufficient receive beam tracking performance, and it may be beneficial to use an approach such as illustrated in FIG. 13 for further receive beam refinement.

Figure 16:
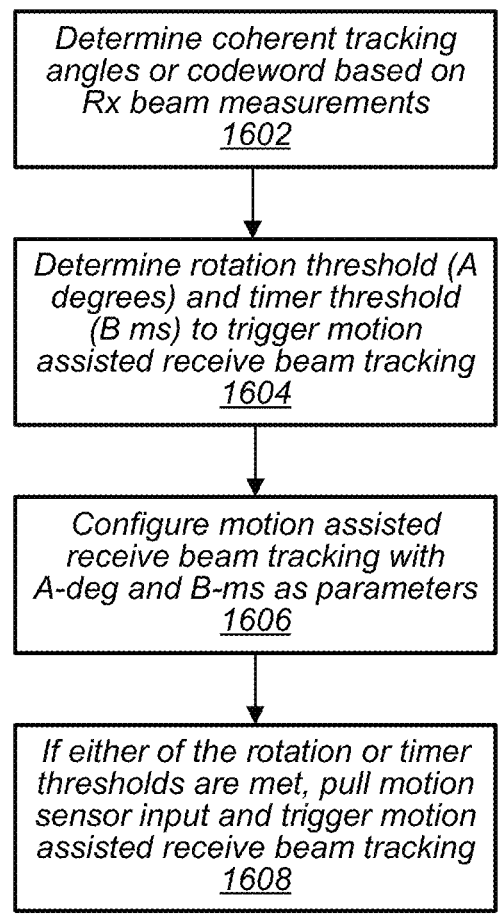
FIG. 16 is a flowchart diagram illustrating aspects of an exemplary possible approach to determining a configuration for using motion sensing information when performing beam tracking, according to some embodiments.

Once the UE determines to enable motion assisted receive beam tracking, the UE may select the parameters (e.g., rotation and/or timer thresholds) for the motion assisted receive beam tracking, as it may be beneficial to use different parameters in different conditions. FIG. 16 is a flowchart diagram illustrating aspects of one possible approach to determining a configuration for using motion sensing information when performing beam tracking, according to some embodiments. In the illustrated approach, the condition(s) for triggering motion assisted receive beam tracking may be determined by motion status of the UE, channel conditions of the UE, and the receive beam codebook spatial granularity. For example, if motion is high, the condition(s) may be configured to trigger motion assisted receive beam tracking more often due to UE orientation changes. Similarly, if the codebook for the receive beam is relatively dense in the spatial domain, it may be possible to obtain larger gains by triggering motion assisted receive beam tracking more frequently.

As shown, in the illustrated approach, in 1602, the UE may determine current coherent tracking angles and analog codeword selection strategy based on receive beam measurements. In the case of determining coherent tracking angles, as one possibility, conditions may be divided into sparse multipath or rich multipath, e.g., based on existing measurements on CSI-RS and SSB for different receive beams. Sparse multipath conditions may include those in which only 1-2 SSB and CSI-RS beams have strong RSRP and the strong RSRP is limited to receive beams with close angular domain separation, as one possibility. Rich multipath conditions may include those in which at least 2 SSB and CSI-RS beams have strong RSRP and the strong RSRP is available from receive beams with large angular domain separation, as one possibility.

In 1604, the UE may determine a rotation threshold ("A" degrees) and a timer threshold ("B" ms) to trigger motion assisted receive beam tracking. As one possibility, for a sparse multipath scenario, as there may be only 1-2 multipath beams incoming, with relatively close angles, the rotation threshold may be set to an angle that corresponds to a selected amount ("X" dB) of degradation based on the current reference receive beam. It may be the case that the UE only needs to track a single incoming direction change in this scenario. Further, in this scenario, the timer threshold may be set to a value equal to A degrees divided by the average rotation speed of the UE, as one possibility. This may facilitate triggering of motion and/or PDSCH assisted receive beam tracking at least according to the average rotation speed to prevent an excessively long amount of time occurring without checking whether to modify the receive beam configuration.

As another possibility, for a rich multipath scenario, as there may be multiple multipath beams incoming, with distinct angles, the rotation threshold may be set to an angle that corresponds to a selected amount ("X" dB) of degradation based on the current reference receive beam as well as the second strongest reference receive beam. It may be the case that the UE needs to track at least two distinct angles in this scenario. Further, in this scenario, the timer threshold may be set to a value equal to A degrees divided by the average rotation speed of the UE, as one possibility, e.g., similarly to facilitate triggering of motion assisted receive beam tracking at least according to the average rotation speed to prevent an excessively long amount of time occurring without checking whether to modify the receive beam configuration.

In 1606, the UE may configure motion assisted receive beam tracking with A degrees and B ms as parameters. In 1608, if either of the rotation or timer thresholds are met, the UE may pull motion sensor input and trigger motion assisted receive beam tracking. Note that this step may also correspond to step 1304 of FIG. 13, at least according to some embodiments.

Figure 17:
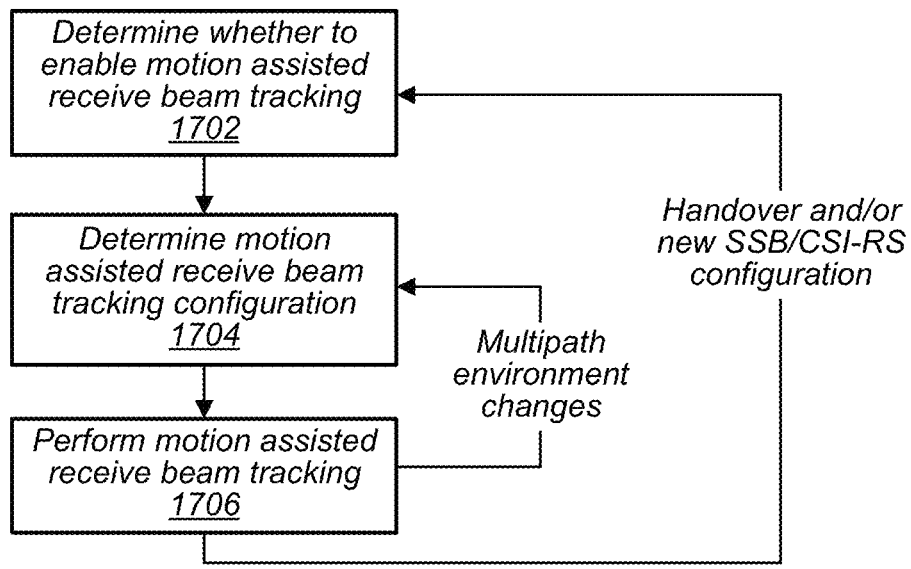
FIG. 17 is a flowchart diagram illustrating aspects of an exemplary possible approach to determining when to re-evaluate whether and with which configuration to use motion sensing information when performing beam tracking, according to some embodiments.

As circumstances change, it may be useful to reevaluate whether to enable motion assisted receive beam tracking, and/or to reselect which parameters to use for the motion assisted receive beam tracking, e.g., to maintain the effectiveness of the motion assisted receive beam tracking. FIG. 17 is a flowchart diagram illustrating aspects of an exemplary possible approach to determining when to re-evaluate whether and with which configuration to use motion sensing information when performing beam tracking, according to some embodiments.

As shown, in 1702, the UE may determine whether to enable motion assisted receive beam tracking, such as according to the approach illustrated in FIG. 15, or according to another possible approach. In 1704, if the UE determines to enable motion assisted receive beam tracking, the UE may determine a motion assisted receive beam tracking configuration, such as according to the approach illustrated in FIG. 16, or according to another possible approach. In 1706, once the UE determines a motion assisted receive beam tracking configuration, the UE may perform motion assisted receive beam tracking, such as according to the approach illustrated in FIG. 13, or according to another possible approach. If the multipath environment changes, the UE may return to step 1704 to re-evaluate the motion assisted receive beam tracking configuration. This may be useful, e.g., in case the receive beam RSRP has dramatically changed with the different receive beam, as one possibility. If handover occurs and/or a new SSB/CSI-RS configuration is received, the UE may return to step 1702 to re-evaluate whether to enable motion assisted receive beam tracking. This may be useful, e.g., in case the new configuration results in better or worse receive beam tracking performance using the newly configured reference signals.

Figure 18:
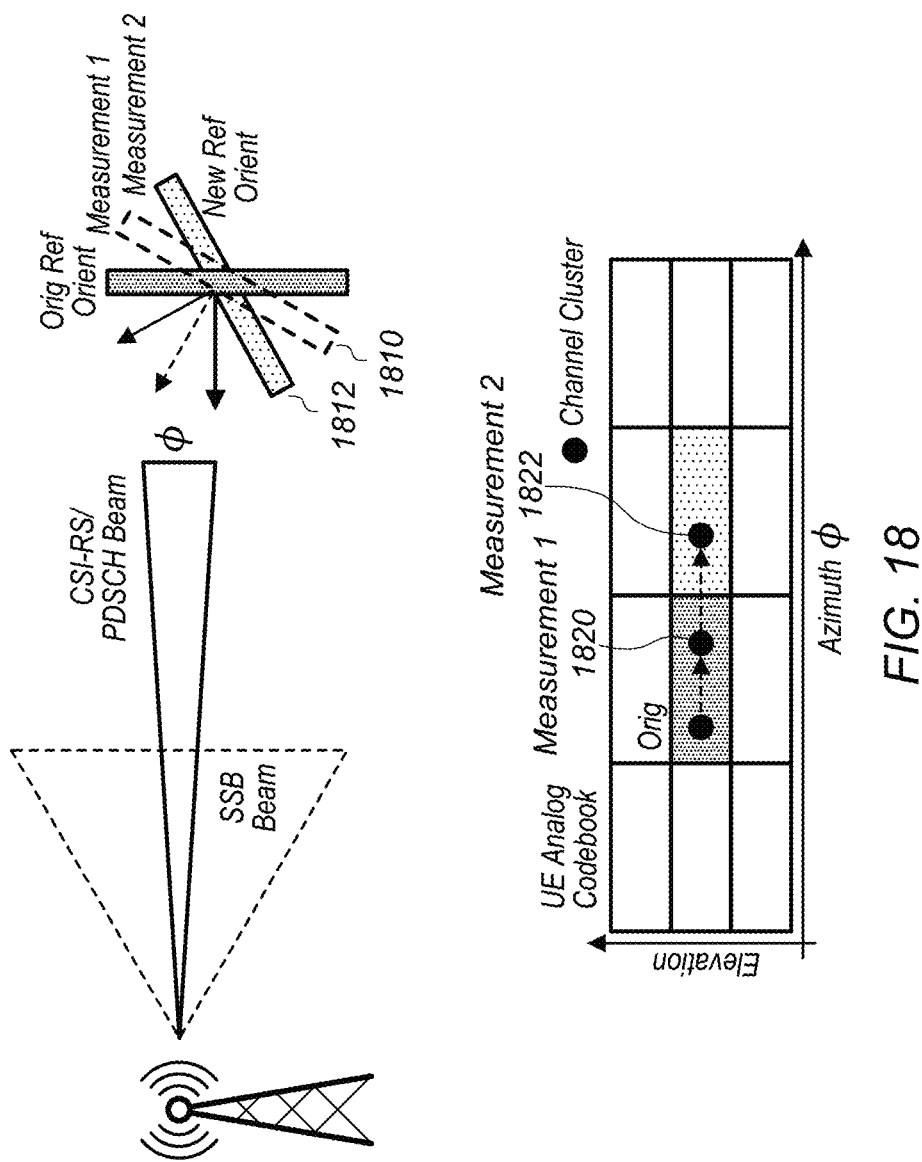
FIG. 18 illustrates additional aspects of an example scenario in which a wireless device performing motion sensing information assisted beam tracking is rotated while receiving wireless signals.

FIG. 18 illustrates additional aspects of an example scenario in which a wireless device performing motion sensing information assisted beam tracking and/or PDSCH-assisted beam tracking is rotated while receiving wireless signals. In the illustrated scenario, a gNB and a UE may communicate using 5G NR in non-standalone mode in frequency range 2 (FR2). As shown, in the illustrated scenario, the UE may receive a SSB beam as well as a CSI-RS beam. During data reception 1 to 2 fine transmit beams may be used and may be quasi-colocated (QCL)/identical to the CSI-RS beams for P3. Accordingly, it may be possible to use data beam reception to maintain receive beam tracking in addition to the dedicated P3 CSI-RS. As shown, when rotation with respect to a reference orientation that is greater than a certain threshold is detected, then for example, a +/−45 degree perturbation on 1-2 antenna elements according to the orientation change may be applied for the next downlink data slot. Such a phase change may be less abrupt than a codeword change and may thus have lower impact on existing data reception. Such a perturbation is illustrated in FIG. 18 as the initial 'measurement 1' rotation 1810 of the UE and in the UE analog codebook as 'measurement 1' 1820. Further rotation of the UE may result in a perturbation to a different codeword of the UE analog codebook, such as illustrated in FIG. 18 as the subsequent 'measurement 2' rotation 1812 of the UE and in the UE analog codebook as 'measurement 2' 1822. In each case, if metrics (e.g., SNR, RSRP, etc.) improve, the new pertubed codeword may be kept, while if the metrics do not improve, the UE may revert back to the original code word (gradient descent). Note that for certain array sizes, the perturbation may be as simple as applying +/−45 degree on one antenna element. Note also that it may be possible to apply different weights to two polarization to double the search (e.g., one shot to complete early-late-gate estimation).

Figure 19:
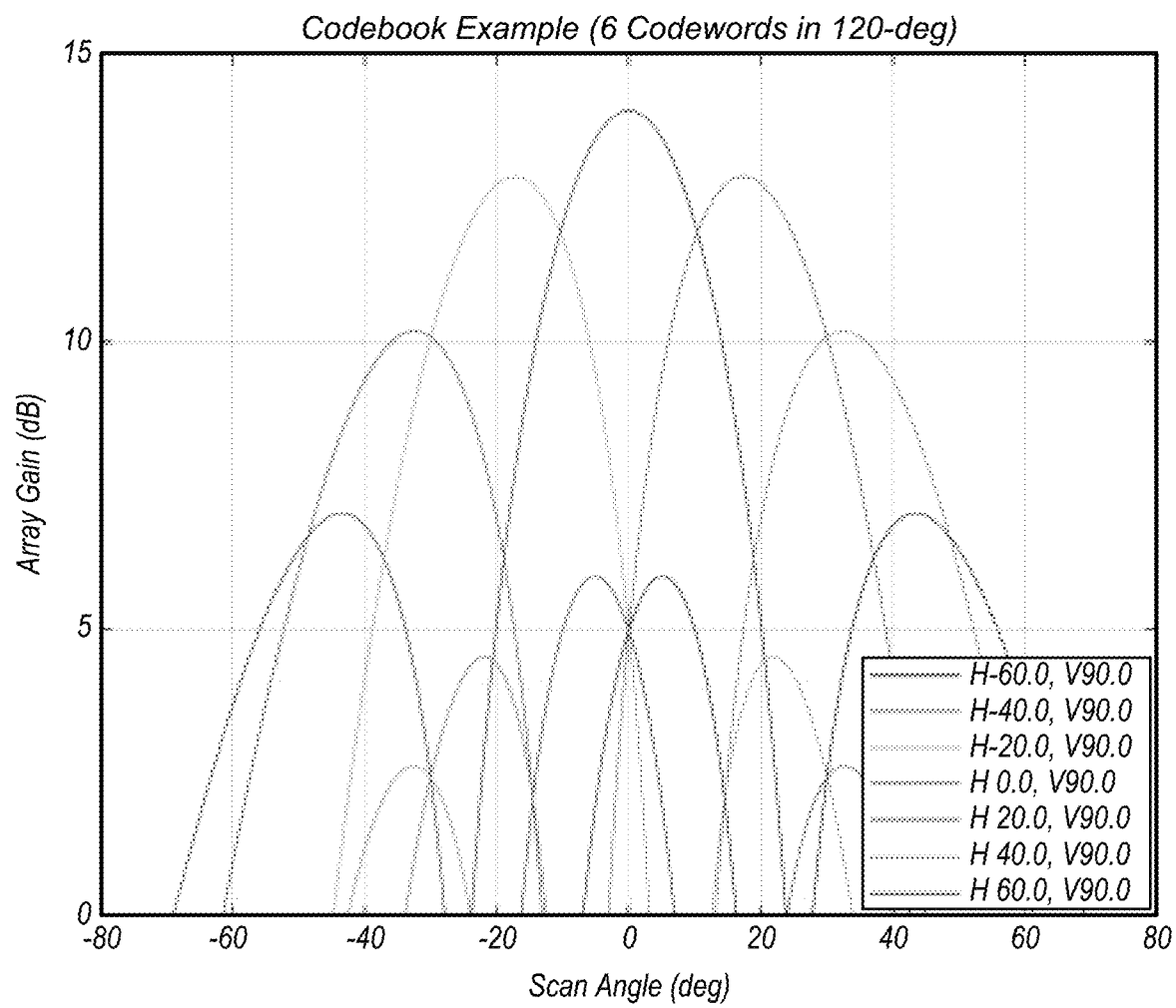
FIGS. 19-20 illustrate exemplary possible receive beam codebooks, according to some embodiments.
Figure 20:
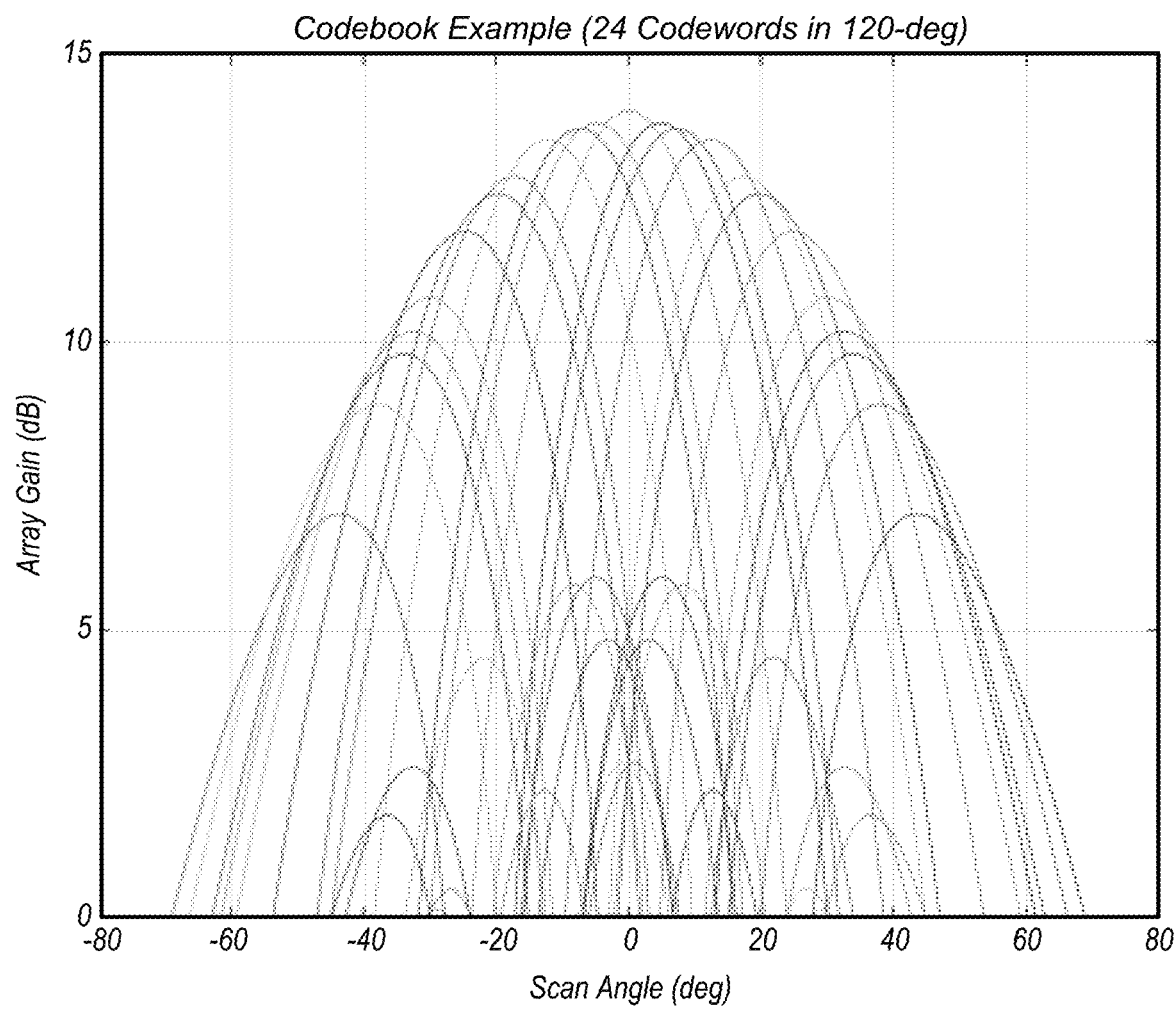

As previously noted, a motion assisted receive beam tracking approach may include selection of whether to apply a phase delta to the current receive beam codeword or to select a different receive beam codeword than the current receive beam codeword in view of a certain rotation delta, and only updating to the new receive beam if it improves SNR/RSRP/etc. It may be preferable for the deviation from the current receive beam codeword to be limited/controlled, e.g., to minimize possible loss during reception, since the data beam may be used to determine whether reception is improved with the new receive beam. In some instances, it may be preferable for the deviation to be implemented without need for angle of attack (AoA) or absolute orientation, and for the deviation to be robust to unknown channel and antenna imperfectness. Accordingly, as one possibility, for a small codebook, one approach may include to apply a pi/4 adjustment on one or more antenna elements and check whether such an adjustment falls into an existing codeword, then use the resulting configuration. For a large codebook, it may be possible to skip the pi/4 adjustment on one or more antenna elements. FIGS. 19-20 illustrate examples of relatively small and large codebooks, according to some embodiments. In particular, FIG. 19 illustrates a codebook example with 6 codewords in 120 degrees, while FIG. 20 illustrates a codebook example with 24 codewords in 120 degrees.

Figure 21:
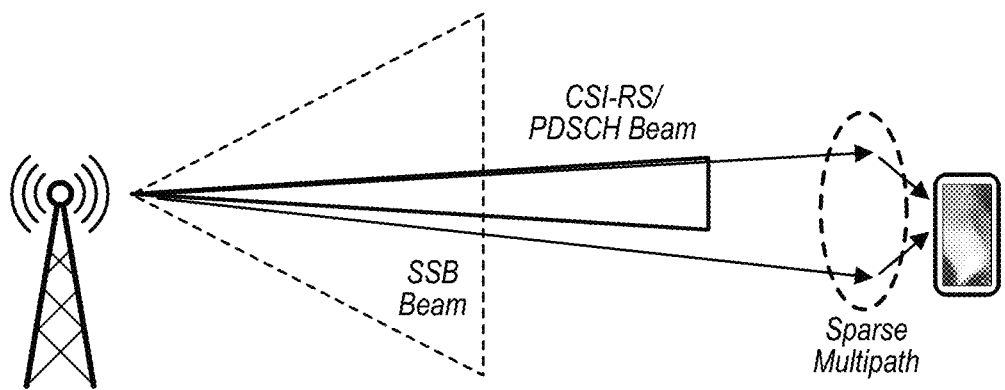
FIGS. 21-30 illustrate various parameters and results of an exemplary possible test scenario in which motion sensing information assisted beam tracking can be used, according to some embodiments.
Figure 22:
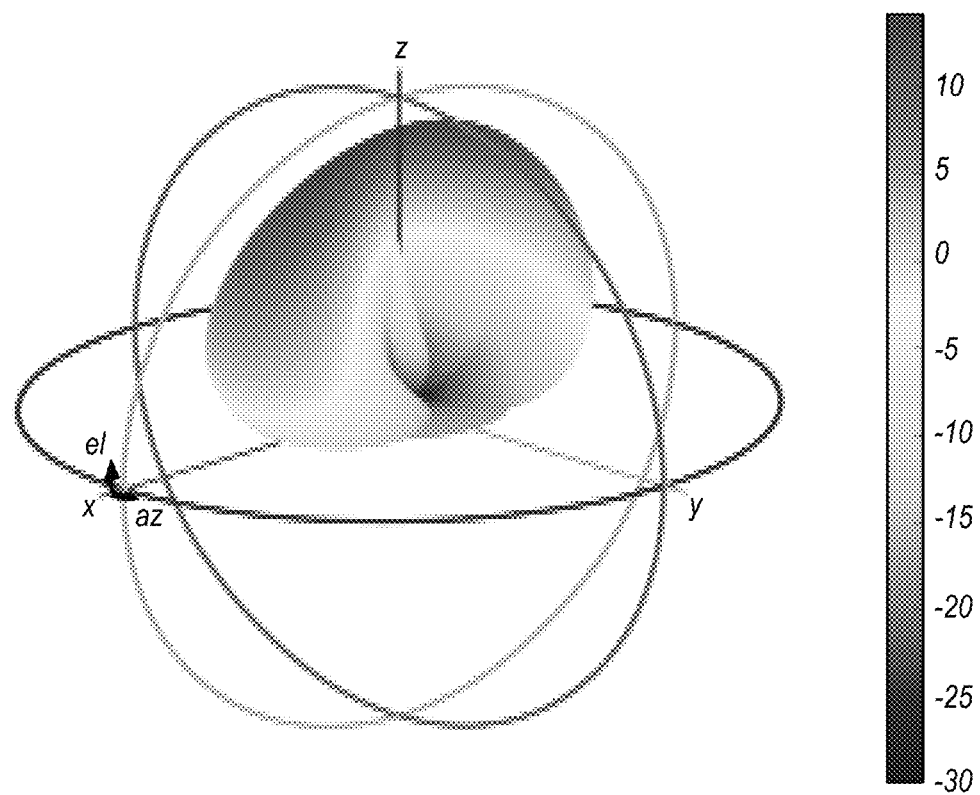
Figure 23:
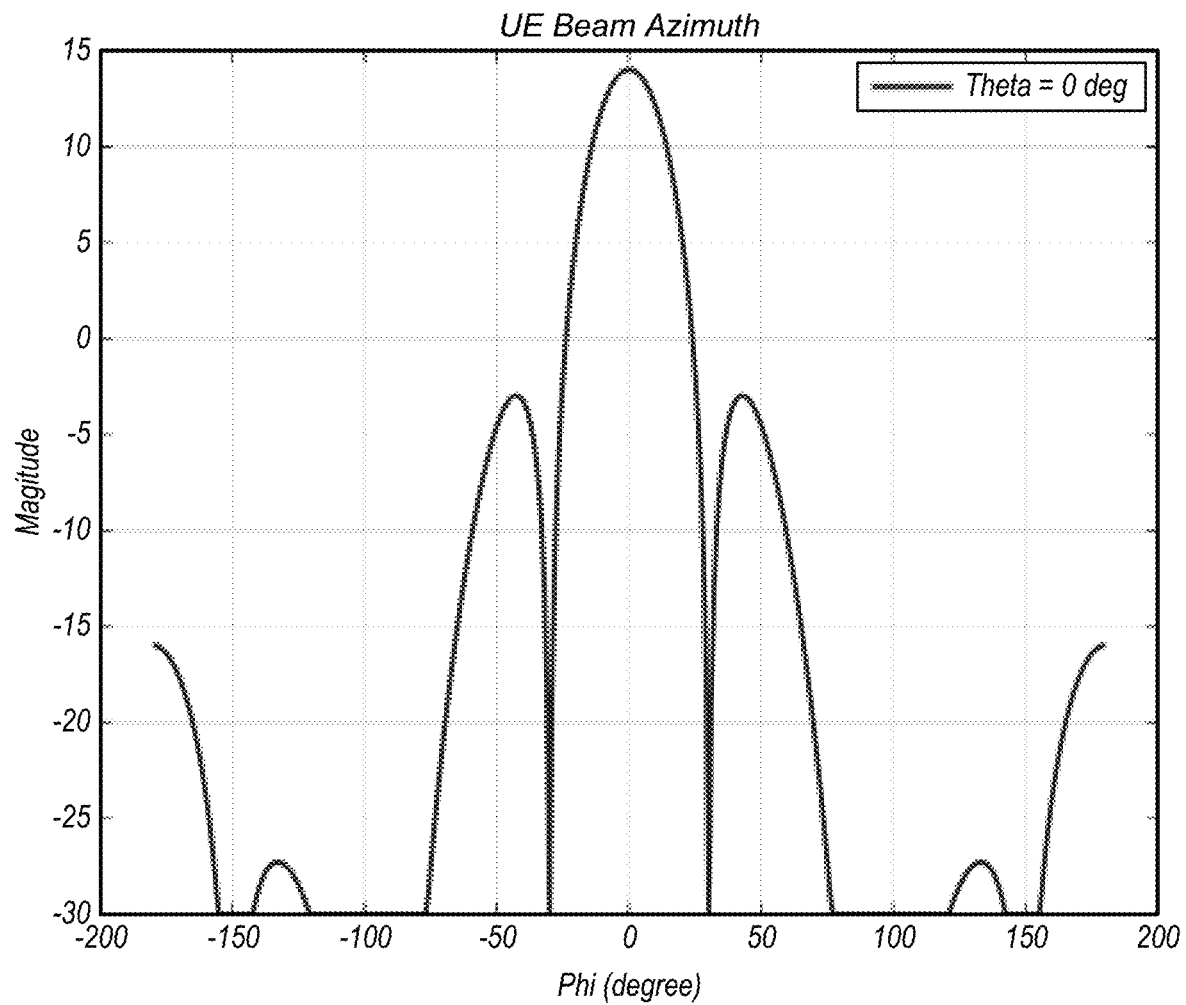

FIGS. 21-30 illustrate various parameters and results of an exemplary possible test scenario in which motion sensing information assisted beam tracking can be used, according to some embodiments. FIG. 21 illustrates aspects of the beam arrangement of the test scenario. According to the configuration, the gNB may have a number of antennas with an element pattern in accordance with 3GPP 36.873. 1 CSI-RS beam with half power bandwidth (HPBW) in the azimuth of ~4 degrees and in the elevation of ~8 degrees, and 1 SSB beam with HPBW in the azimuth of ~34 degrees and in the elevation of ~8 degrees may be used, such as illustrated in FIGS. 8-9. The UE may have a 4×1 or 2×1 antenna array, in an element pattern in accordance with 3GPP 36.873. The UE beam may have HPBW in the azimuth of ~20 degrees and in the elevation of ~65 degrees. A visual representation of the UE beam is illustrated in FIG. 22, while FIG. 23 is a graph illustrating aspects of a signal strength pattern for the UE beam in the azimuth. The channel model used may be a two-ray model (sparse multipath).

Figure 24:
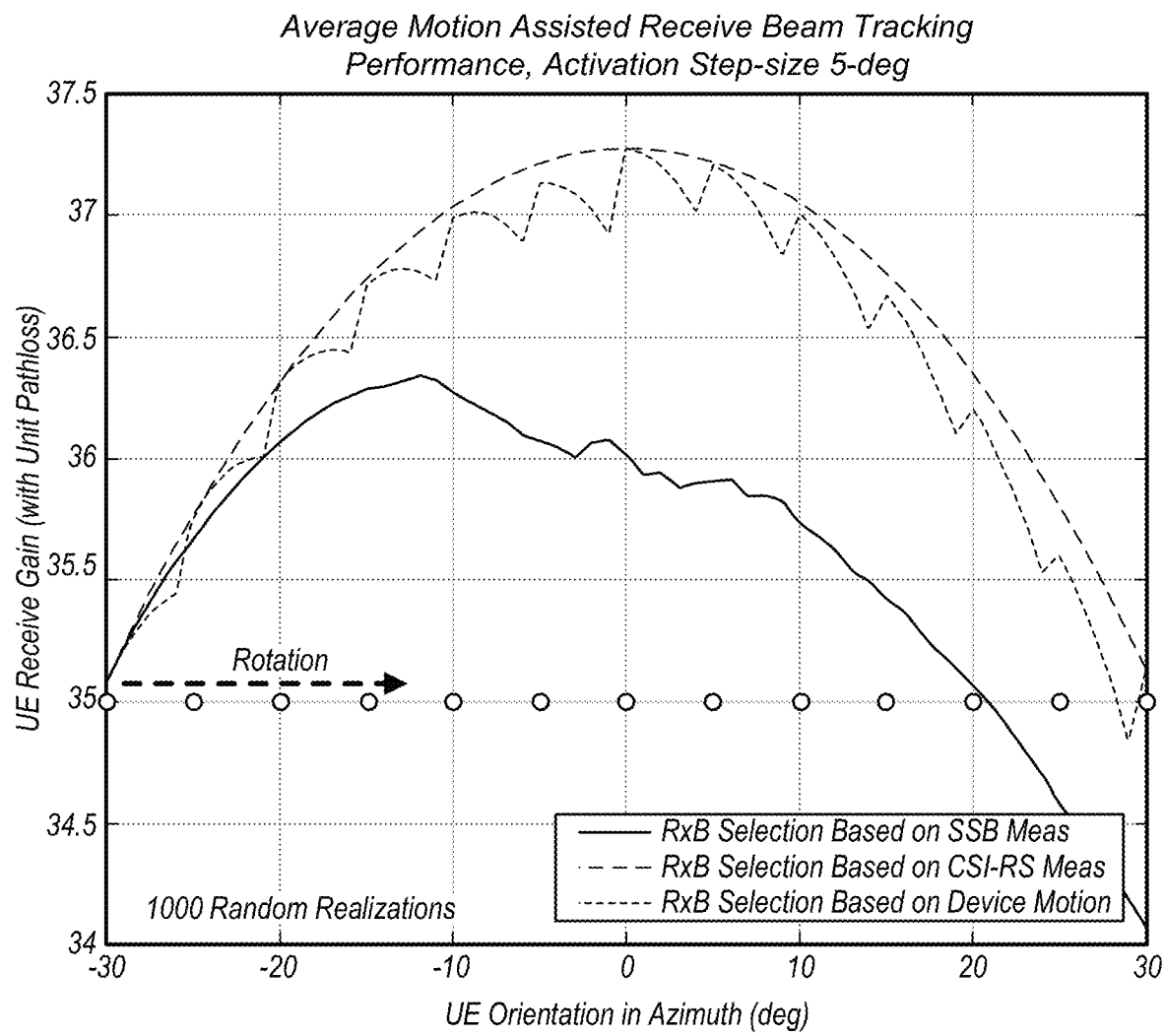
Figure 25:
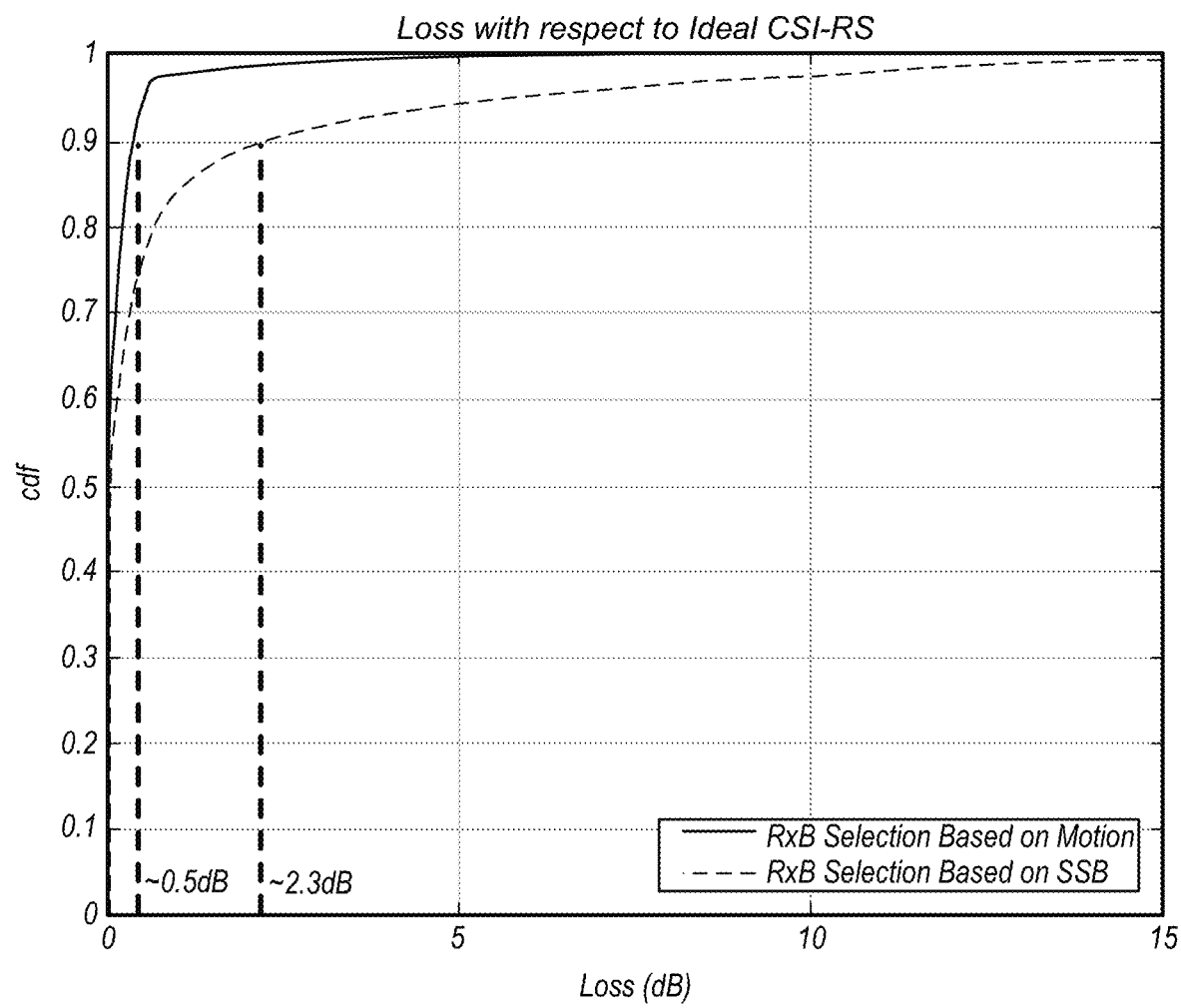
Figure 26:
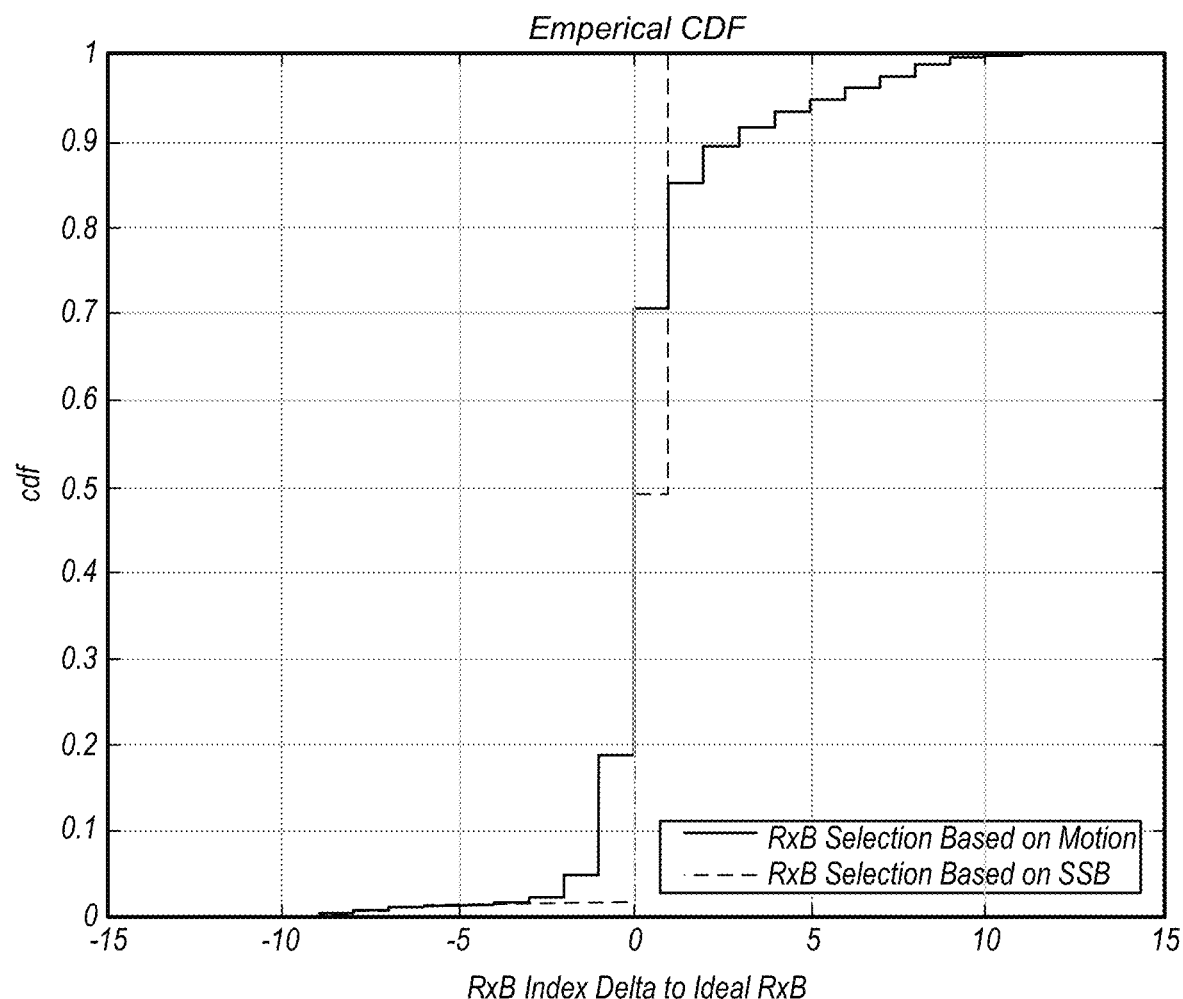

A first test scenario may include a scenario in which P3 CSI-RS are not abundant. In particular, in the first test scenario, it may be assumed that initial P3 measurements are provided followed by no further scheduled P3 measurements, such that any subsequent receive beam adjustments/selection is based on SSB measurements. FIGS. 24-26 illustrate aspects of UE performance when using a motion assisted receive beam tracking approach relative to when not using a motion assisted receive beam tracking approach in such a scenario. As shown in FIG. 24, when motion assisted receive beam tracking is triggered at 5 degree steps, the motion assisted receive beam tracking approach results in substantially better UE receive gain than when receive beam selection is based on SSB measurements without motion detection assistance, and nearly converges to an 'ideal' scenario in which continuous P3 receive beam selection is performed. Note that such an 'ideal' scenario may be unavailable in practice, since such continuous P3 measurements would preclude any data transmission, but may represent a useful benchmark for the effectiveness of the motion assisted receive beam tracking approach. FIG. 25 further illustrates that the loss with respect to the 'ideal' CSI-RS scenario is substantially less for the motion assisted receive beam tracking approach than for the receive beam selection based only on SSB measurements in the illustrated test scenario, while FIG. 26 is an empirical cumulative distribution function (CDF) illustrating that the receive beam index delta to the ideal receive beam for the motion assisted receive beam tracking approach may generally remain closer to zero than for receive beam selection based on only SSB measurements in the illustrated test scenario. It may also be noted that in the illustrated test scenario, for a 60 degree rotation completed in 1 second, with 120 KHz subcarrier spacing and 8000 total slots, the data interruption caused by the use of the motion assisted receive beam tracking approach may be less than 0.2%.

Figure 27:
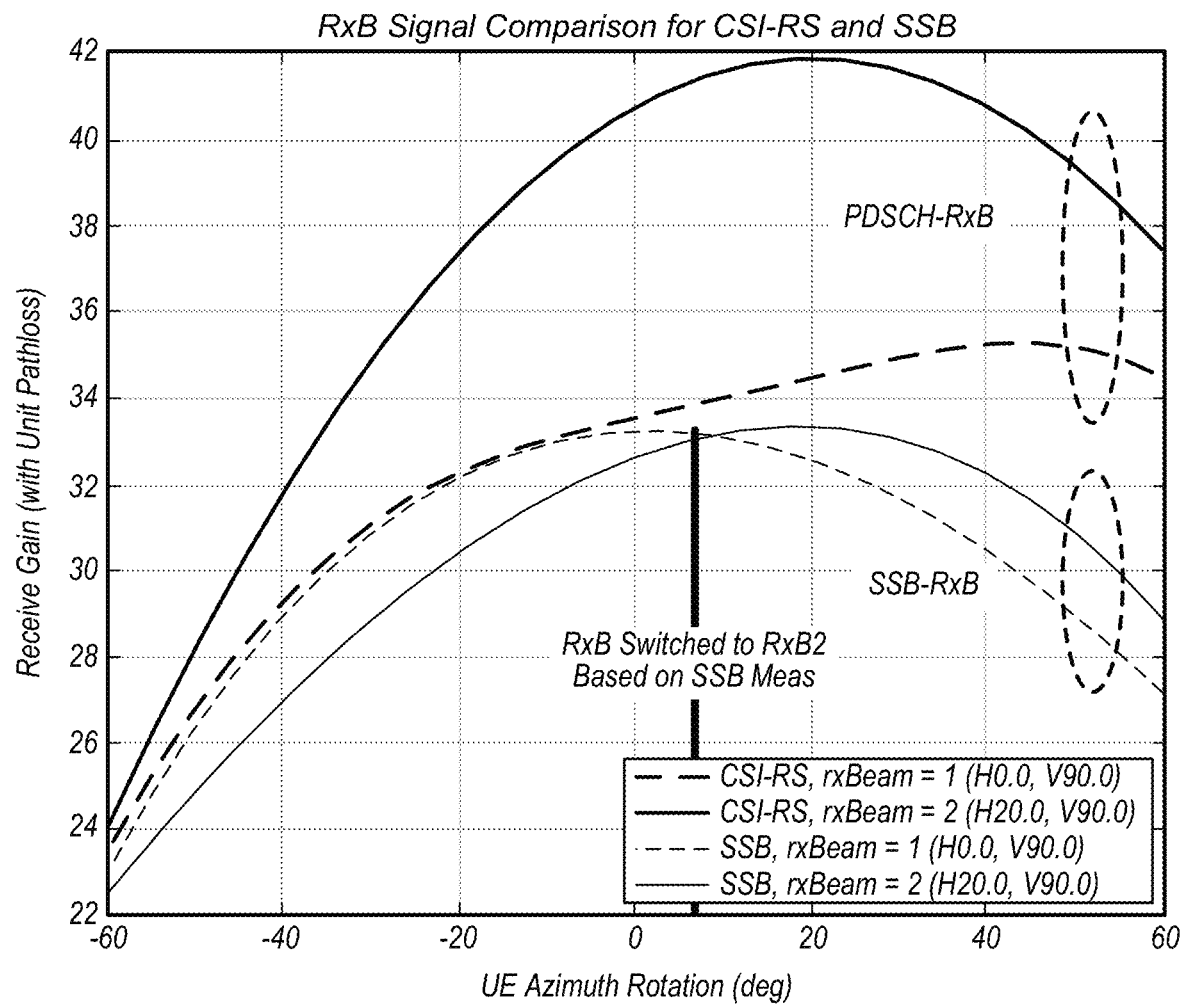
Figure 28:
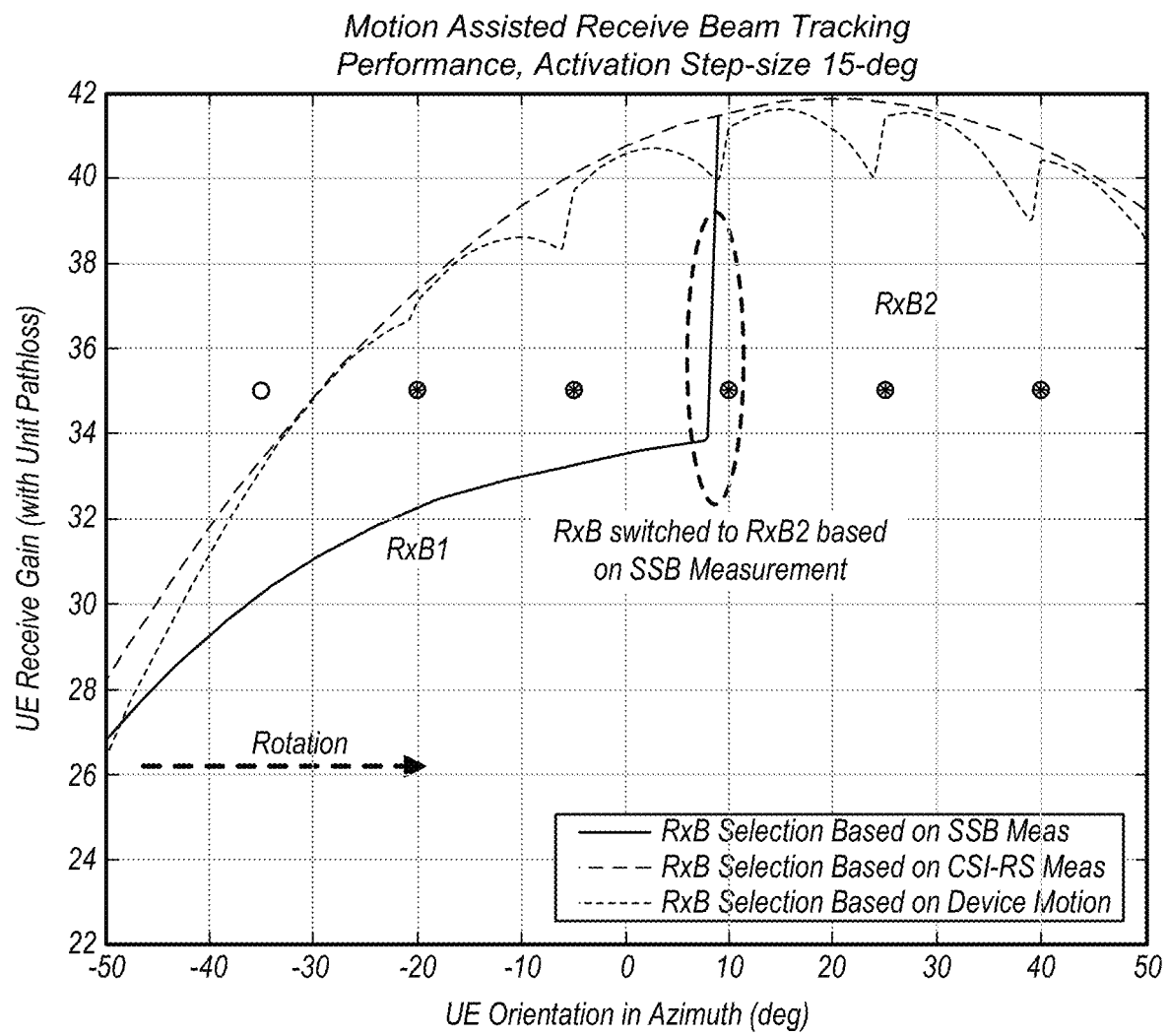

FIGS. 27-28 illustrate aspects of PDSCH beam tracking performance using SSB measurements and using a motion assisted receive beam tracking approach, respectively. In the illustrated scenario, it may be possible for the receive beam selected based on SSB measurements to be misaligned with the ideal PDSCH receive beam, e.g., even if continuous measurements are available. For example, as shown in FIG. 27, through a substantial portion of the illustrated test rotation, the receive beam with the highest receive gain according to SSB measurements may be receive beam 1, while the receive beam with the highest receive gain according to CSI-RS measurements may be receive beam 2. In contrast, as shown in FIG. 28, in the test scenario the motion assisted receive beam tracking approach may substantially converge to the same receive beam (receive beam 2) that would be selected based on continuous CSI-RS measurements, including for the portion of the rotation in which SSB measurement based receive beam selection would result in selection of receive beam 1.

Figure 29:
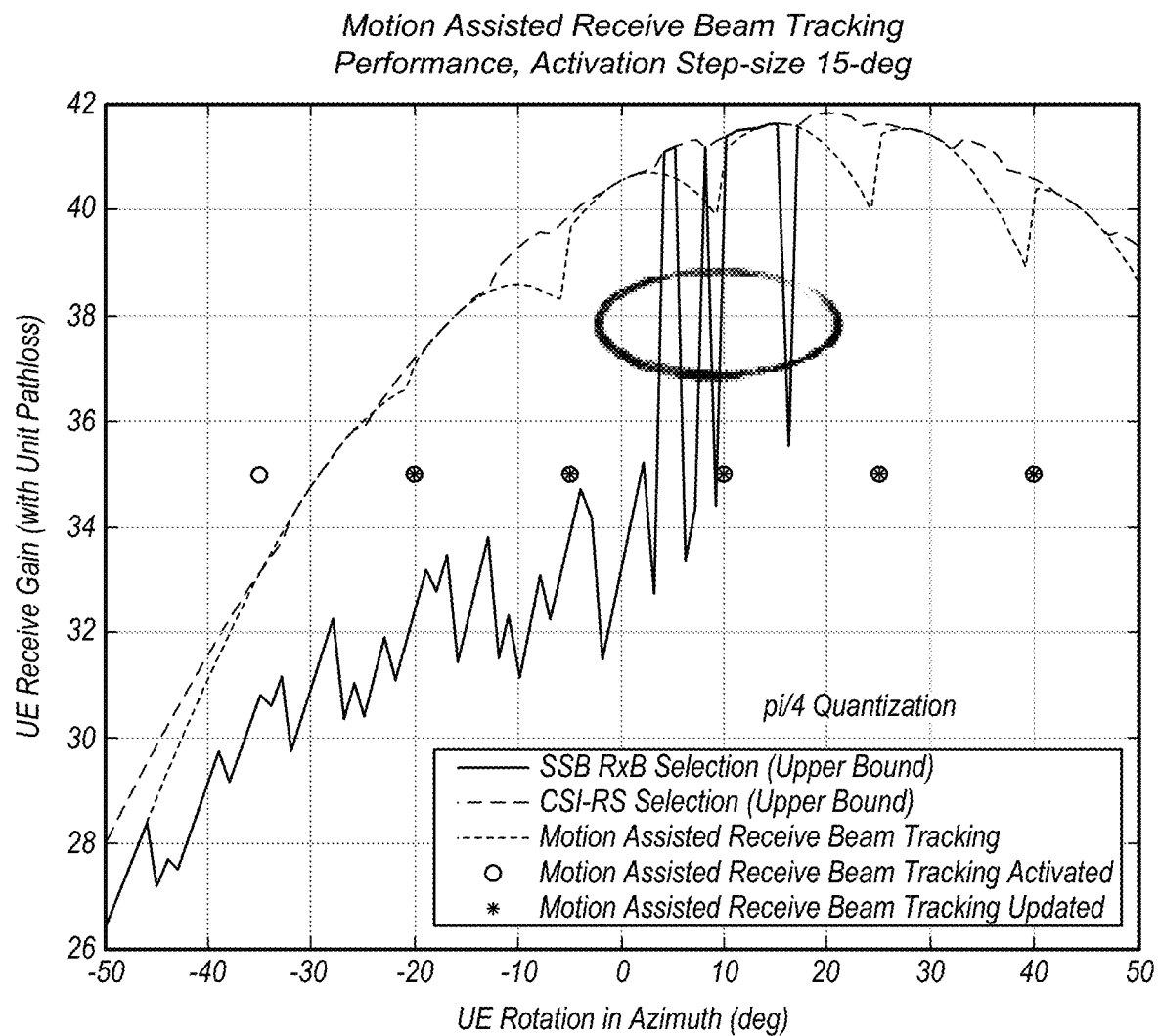
Figure 30:
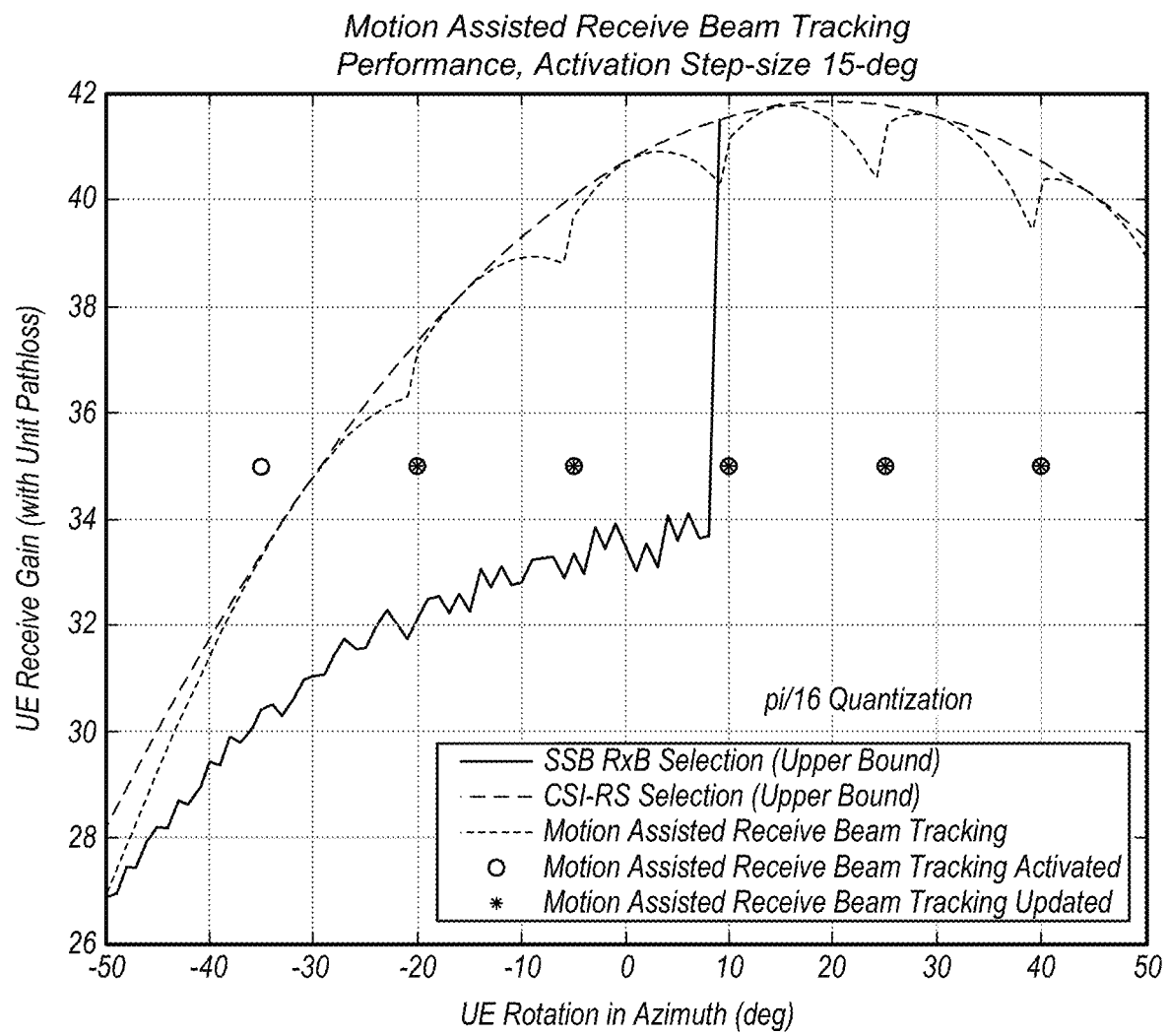

FIGS. 29-30 illustrate the impact of use of different phase shifter quantization values when using a motion assisted receive beam tracking approach in the test scenario. In FIG. 29, a pi/4 quantization may be used, while in FIG. 30, a pi/16 quantization may be used. As shown, the motion assisted receive beam tracking approach may produce similar results with both phase shifter quantization values, at least in the illustrated test scenario.

FIGS. 31-34 illustrate aspects of an exemplary possible technique for maintaining an orientation indexed beam data base, according to some embodiments. A beam data base may be used in at least some beam tracking techniques, e.g., to assist with selecting one or more receive beams to search when a certain transmit configuration is indicated (e.g., using a transmission configuration indication (TCI)). As one possibility, the beam data base may include a table in which RSRPs for each of various possible receive beams, for each of one or more reference signals, for some set of recent measurements, are recorded.

Figure 31:
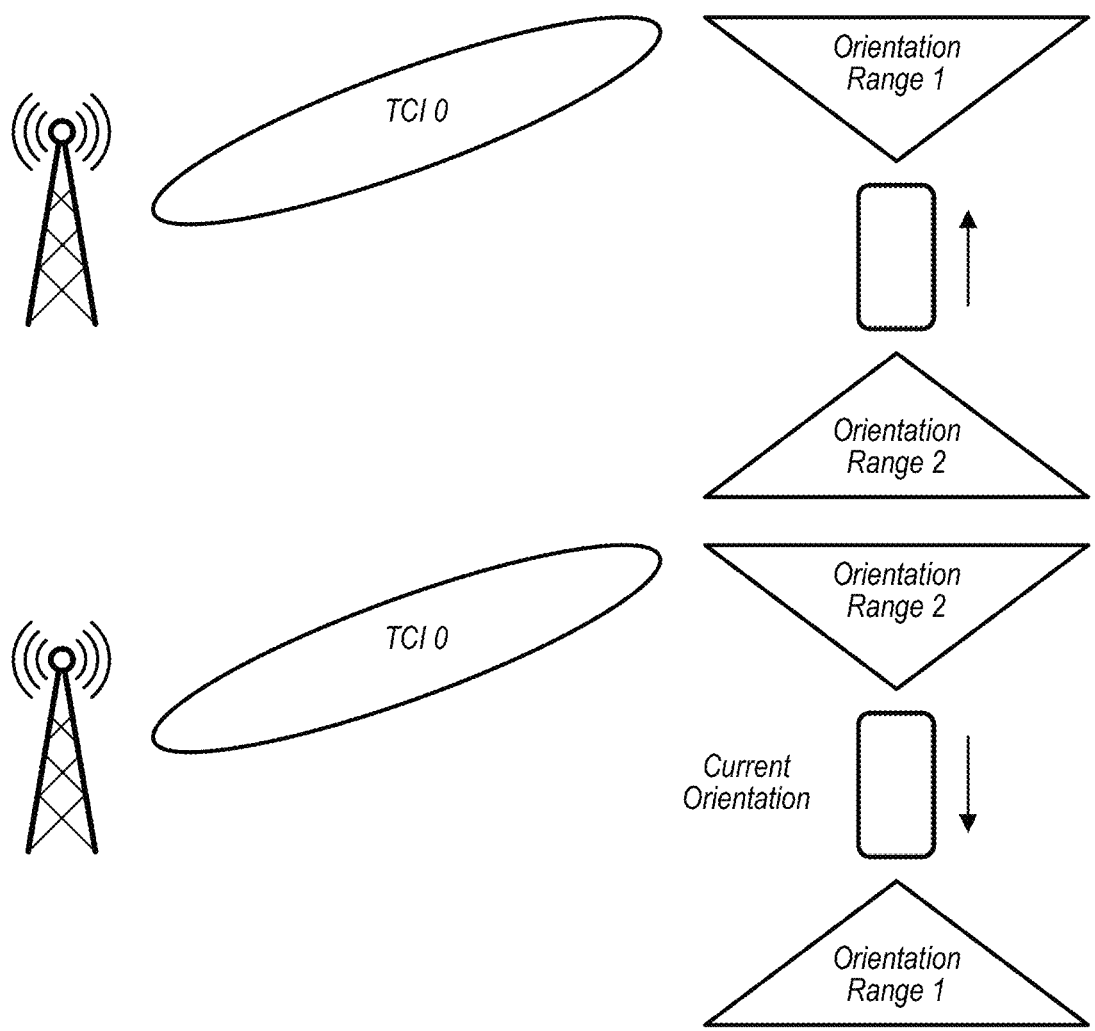

Given the possibility of rotation of a wireless device, in some instances, it may be useful to associate a beam data base with a particular orientation range (e.g., the orientation of the wireless device at the time the measurements were made), e.g., since if the orientation of the wireless device changes and the beam data base is not updated accordingly, it may be possible for misalignment to occur. Further, it may possibly be beneficial to utilize multiple orientation indexed beam data bases, e.g., for each of multiple possible orientations. In this way, the wireless device may be able to use the most applicable beam data base for its current orientation when selecting one or more receive beams to search. For example, FIG. 31 illustrates aspects of an exemplary scenario in which 2 orientation ranges (e.g., which are opposite to each other) are specified. Depending on the orientation of the wireless device and the TCI provided by the cellular base station, the beam data base associated with the orientation range 1 may be used, or the beam data base associated with the orientation range 2 may be used; in the illustrated example, given the current orientation of the wireless device and the TCI provided by the cellular base station, the beam data base associated with the orientation range 2 may be used.

FIG. 32 further illustrates a simplified example of a table in which beam data base information for the 2 orientation ranges illustrated in FIG. 31 is included. Continuing the example from the illustrated scenario of FIG. 31, in this case the beam data base associated with orientation range 2 may be used by the wireless device.

Note that while 2 orientation ranges are illustrated in the example scenario of FIGS. 31-32, any number of orientation ranges may be used, as desired. However, it should be noted that defining a greater number of orientation ranges may require greater memory/storage capacity, and/or that it may be possible for diminishing benefits to be obtained beyond a certain number of orientation ranges, at least according to some embodiments.

Figure 33:
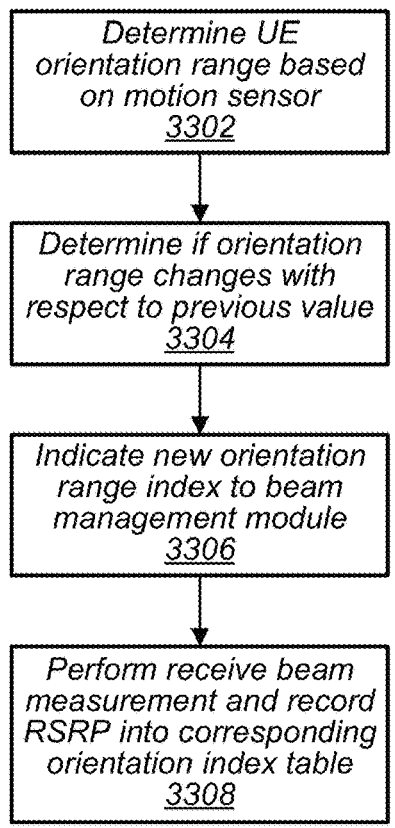

FIG. 33 is a flowchart diagram illustrating a possible procedure for updating an orientation indexed beam measurement data base, according to some embodiments. As shown, in 3302, a UE may determine its orientation range, e.g., based on motion sensing circuitry of the UE. In 3304, the UE may determine if its orientation range has changed with respect to its previous orientation range value. In 3306, the UE may indicate its new orientation range index (possibly only if the orientation range index has changed, if desired) to a beam management module of the UE. In 3308, the UE may perform receive beam measurement(s) and record the resulting RSRP(s) into the orientation index table associated with the current orientation range.

Figure 34:
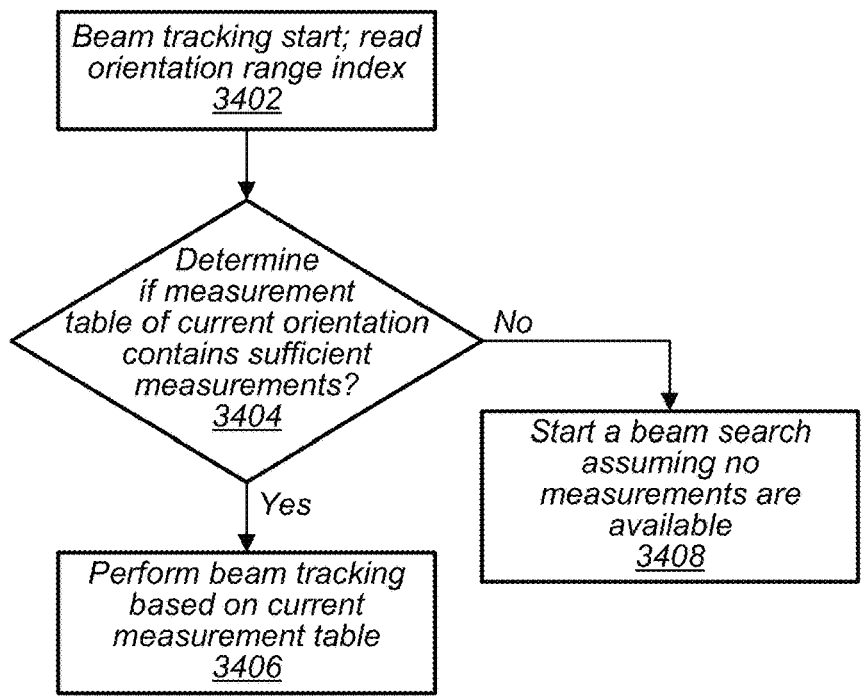

FIG. 34 is a flowchart diagram illustrating a possible procedure for performing beam tracking with orientation input, according to some embodiments. In 3402, a UE may begin the beam tracking process, and determine its current orientation range index. In 3404, the UE may determine if the measurement table for the current orientation of the UE includes sufficient measurements (e.g., to be used to select beam search candidates). If so, in 3406, the UE may perform beam tracking based on the measurement table for the current orientation of the UE. If not, in 3408, the UE may start a beam search assuming no measurements are available.

Figure 35:
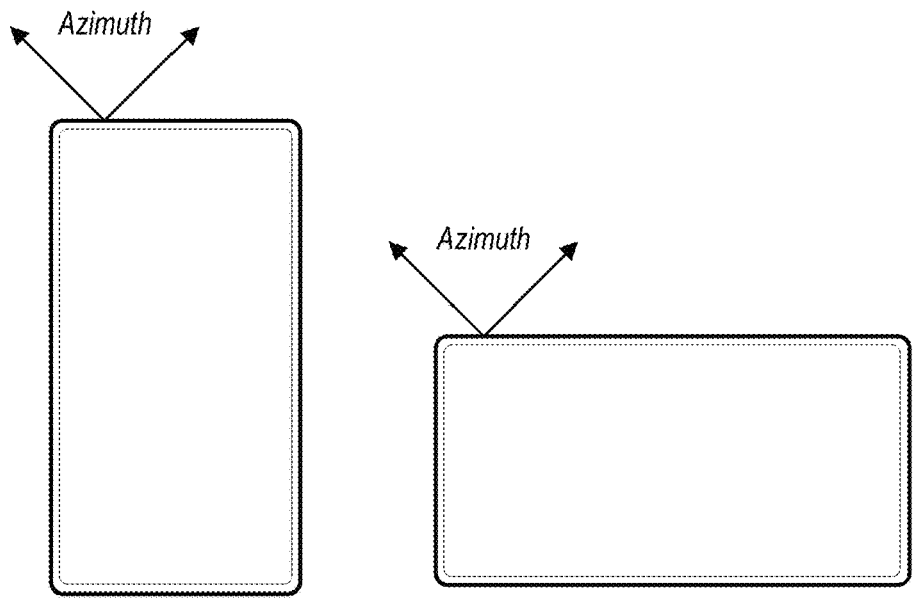
FIGS. 35-36 illustrate aspects of an exemplary possible technique for performing an orientation prioritized beam search, according to some embodiments.

As previously noted, both SSB and CSI-RS beams (e.g., among other possible beams provided by a cellular base station) may have different characteristics (e.g., HPBW profiles) in the azimuth and in the elevation. For example, for a gNB, it may typically be preferable to have a narrower azimuth beam (e.g., relative to elevation) due to richer angular spread in the azimuth domain, at least according to some embodiments. FIG. 35 illustrates how the orientation of the azimuth domain may differ for a UE depending on the orientation/posture of the UE, at least according to some embodiments. Accordingly, another technique that may be useful for at least some UEs may include utilizing motion sensing information to detect UE orientation or posture and to prioritize beam search in the azimuth or elevation accordingly. For example, while in a SSB search, it may be the case that either elevation or azimuth may be prioritized, for the data beam, it may be the case that azimuth may be prioritized, at least in some instances. In order to do so, it may be the case that orientation information is required. As an example, for uplink beam management, the UE may prioritize first sweeping across the azimuth beam, e.g., to reduce or minimize the amount of transmission to lock in a suitable uplink beam.

Figure 36:
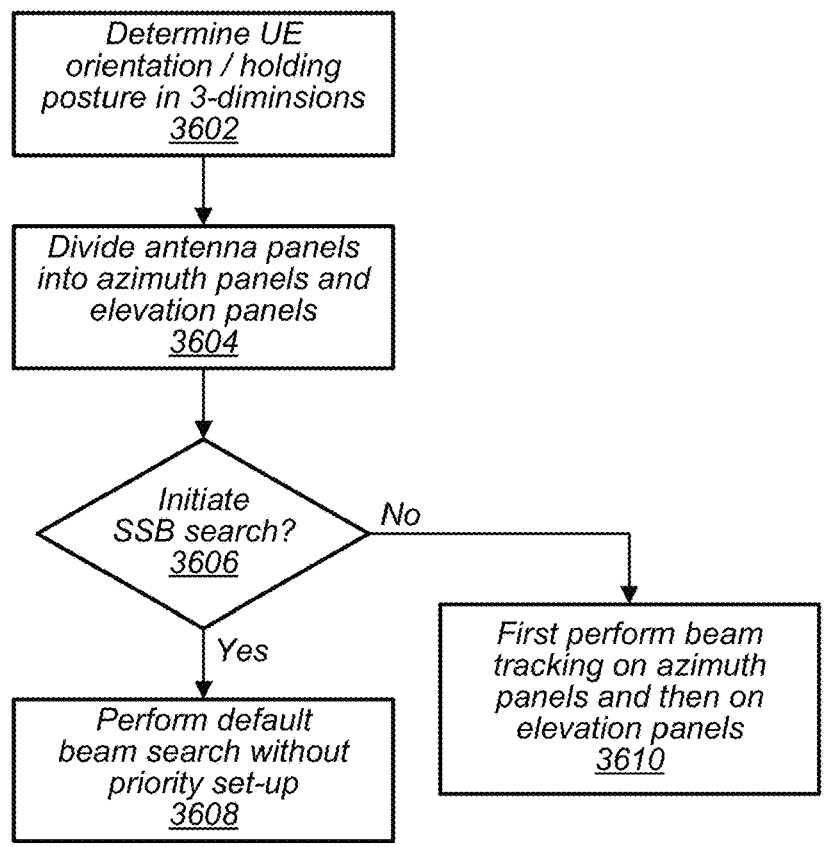

Accordingly, FIG. 36 is a flowchart diagram illustrating a possible procedure for performing UE orientation/posture prioritized beam searches. In 3602, an orientation/holding posture of the UE may be determined in 3 dimensions. In 3604, the antenna panels of the UE may be divided into azimuth panels and elevation panels. In 3606, it may be determined whether a beams search that has been initiated is a SSB search or another type of beam search. If it is a SSB search, in 3608, a default beam search may be performed without orientation priority set-up, e.g., as either azimuth or elevation can be prioritized. If it is not a SSB search, however, in 3610, the UE may first perform beam tracking on the azimuth panels, and then may perform beam tracking on the azimuth panels.

In the following further exemplary embodiments are provided.

One set of embodiments may include an apparatus, comprising: a processing element configured to cause a wireless device to: establish a cellular link with a cellular base station; select a first receive beam configuration for the cellular link; receive downlink data on a physical downlink shared channel (PDSCH) using the first receive beam configuration; detect a trigger to determine whether to modify a receive beam configuration for the cellular link; and determine whether to modify the receive beam configuration for the cellular link, wherein to determine whether to modify the receive beam configuration for the cellular link, the processing element is further configured to cause the wireless device to: select a second receive beam configuration as a candidate modification to the first receive beam configuration; determine whether the second receive beam configuration improves one or more of signal strength or signal to noise ratio relative to the first receive beam configuration using PDSCH data reception; and determine to modify the receive beam configuration for the cellular link to the second receive beam configuration if the second receive beam configuration improves one or more of signal strength or signal to noise ratio relative to the first receive beam configuration.

According to some embodiments, the processing element is further configured to cause the wireless device to: determine whether receive beam configuration selection using reference signals from the cellular base station meets one or more receive beam configuration selection conditions; determine whether to enable the trigger to determine whether to modify the receive beam configuration for the cellular link and whether to enable use of PDSCH data reception for the receive beam configuration selection based at least in part on whether receive beam configuration selection using reference signals from the cellular base station meets the one or more receive beam configuration selection conditions.

According to some embodiments, the one or more receive beam configuration selection conditions comprise one or more of: whether a receive beam configuration selected based on a 3GPP P3 procedure remains unchanged for a certain number of measurements; or whether a signal strength value for a synchronization signal is different from a signal strength value of a data channel by a certain threshold for a certain number of measurements.

According to some embodiments, the processing element is further configured to cause the wireless device to: determine that wireless device handover has occurred and/or a new reference signal configuration has been provided to the wireless device; re-evaluate whether to enable the trigger to determine whether to modify the receive beam configuration for the cellular link and whether to enable use of PDSCH data reception for the receive beam configuration selection based at least in part on determining that wireless device handover has occurred and/or a new reference signal configuration has been provided to the wireless device.

According to some embodiments, the processing element is further configured to cause the wireless device to: select one or more of a rotation threshold or a time threshold based at least in part on one or more of: motion status of the wireless device; multipath conditions at the wireless device; or receive beam codebook spatial granularity for the wireless device wherein the trigger to determine whether to modify the receive beam configuration for the cellular link comprises at least one of: detection of rotation of the wireless device greater than the rotation threshold; or detection of an amount of time greater than the time threshold having elapsed since a previous determination of whether to modify the receive beam configuration.

According to some embodiments, the processing element is further configured to cause the wireless device to: determine that one or more of motion status of the wireless device, multipath conditions at the wireless device, or receive beam codebook spatial granularity for the wireless device has changed; and modify one or more of the rotation threshold or the time threshold based at least in part on the change to one or more of motion status of the wireless device, multipath conditions at the wireless device, or receive beam codebook spatial granularity for the wireless device.

Another set of embodiments may include a wireless device, comprising: an antenna array; a radio operably coupled to the antenna array; and a processing element operably coupled to the radio; wherein the wireless device is configured to: establish a cellular link with a cellular base station, select a first receive beam configuration for the cellular link; receive a downlink data beam using the first receive beam configuration; select a second receive beam configuration as a possible modification to the first receive beam configuration based at least in part on motion sensing information for the wireless device; and determine whether one or more of signal strength or signal to noise ratio for the downlink data beam improves when using the second receive beam configuration relative to when using the first receive beam configuration.

According to some embodiments, to determine whether one or more of signal strength or signal to noise ratio for the downlink data beam improves when using the second receive beam configuration relative to when using the first receive beam configuration, the wireless device is further configured to: receive the downlink data beam using the second receive beam configuration for one or more slots according to the cellular link with the cellular base station; and compare one or more of signal strength or signal to noise ratio for the downlink data beam when received using the first receive beam configuration with one or more of signal strength or signal to noise ratio for the downlink data beam when received using the second receive beam configuration.

According to some embodiments, after the one or more slots in which the downlink data beam is received using the second receive beam configuration, the wireless device is further configured to: receive the downlink data beam using the first receive beam configuration if it is determined that one or more of signal strength or signal to noise ratio for the downlink data beam does not improve when using the second receive beam configuration relative to when using the first receive beam configuration; receive the downlink data beam using the second receive beam configuration if it is determined that one or more of signal strength or signal to noise ratio for the downlink data beam improves when using the second receive beam configuration relative to when using the first receive beam configuration.

According to some embodiments, the wireless device is further configured to: determine to enable one or more triggers to select a possible receive beam configuration modification based at least in part on motion sensing information for the wireless device, wherein determining to enable the one or more triggers to select a possible receive beam configuration modification is based at least in part on receive beam configuration selection using reference signals from the cellular base station not meeting one or more receive beam configuration selection conditions, wherein selecting the second receive beam configuration as a possible modification to the first receive beam configuration is further based at least in part on detecting a trigger to select a possible receive beam configuration modification.

According to some embodiments, the wireless device is further configured to: determine that one or more of wireless device handover has occurred or a new reference signal configuration has been provided to the wireless device; and re-evaluate whether to enable one or more triggers to select a possible receive beam configuration modification based at least in part on motion sensing information for the wireless device based at least in part on determining that one or more of wireless device handover has occurred or a new reference signal configuration has been provided to the wireless device.

According to some embodiments, the second receive beam configuration uses a same receive beam code word as the first receive beam configuration, wherein one or more antenna elements are perturbed in the second receive beam configuration relative to the first receive beam configuration.

According to some embodiments, the second receive beam configuration uses a different receive beam code word than the first receive beam configuration.

Still another set of embodiments may include a method, comprising: by a wireless device: establishing a cellular link with a cellular base station; selecting a receive beam configuration for the cellular link; receiving a downlink data beam using the selected receive beam configuration; selecting a possible modification to the receive beam configuration based at least in part on an estimated rotation of the wireless device relative to a previous position of the wireless device; determining whether the possible modification to the receive beam configuration improves downlink data beam reception; and determining whether to modify the receive beam configuration for the cellular link in accordance with the possible modification to the receive beam configuration based at least in part on whether the possible modification to the receive beam configuration improves downlink data beam reception.

According to some embodiments, the method further comprises: determining to not modify the receive beam configuration for the cellular link if it is determined that the possible modification to the receive beam configuration does not improve downlink data beam reception; and determining to modify the receive beam configuration for the cellular link if it is determined that the possible modification to the receive beam configuration improves downlink data beam reception.

According to some embodiments, the method further comprises: performing receive beam configuration selection using reference signals from the cellular base station without motion sensing information; determining that the receive beam configuration selection using reference signals from the cellular base station without motion sensing information does not meet one or more receive beam configuration selection conditions; determining one or more triggers for selecting a possible modification to the receive beam configuration based at least in part on motion sensing information for the wireless device based at least in part on determining that the receive beam configuration selection using reference signals from the cellular base station without motion sensing information does not meet one or more receive beam configuration selection conditions; and detecting a trigger for selecting a possible modification to the receive beam configuration, wherein selecting a possible modification to the receive beam configuration based at least in part on an estimated rotation of the wireless device relative to a previous position of the wireless device is performed based at least in part on detecting the trigger for selecting a possible modification to the receive beam configuration.

According to some embodiments, the one or more receive beam configuration selection conditions comprise one or more of: receive beam configuration selection using reference signals from the cellular base station without motion sensing information resulting in a same receive beam configuration being selected for at least a certain number of measurements; or a signal strength value for a synchronization signal from the cellular base station differing from a signal strength value of a data channel from the cellular base station by less than a difference threshold for at least a certain number of measurements.

According to some embodiments, the one or more triggers comprise one or more of: detection of the wireless device rotating by an amount greater than a rotation threshold; or detection of an amount of time having elapsed since a previous trigger for selecting a possible modification to the receive beam configuration that is greater than a time threshold.

According to some embodiments, the method further comprises: determining a current orientation range of the wireless device from at least a first orientation range and a second orientation range; and performing a beam search based at least in part on measurement data from a measurement table associated with the current orientation range of the wireless device.

According to some embodiments, the method further comprises: determining an orientation of the wireless device; determining that one or more antenna panels of the wireless device are currently azimuth panels and that one or more antenna panels of the wireless device are currently elevation panels; and performing a beam search, wherein beam tracking on the azimuth panels is prioritized in the beam search.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
by a wireless device:
establishing a cellular link with a cellular base station;
selecting a receive beam configuration for the cellular link including a selected receive antenna orientation of the wireless device, said selecting comprising performing receive antenna orientation selection using reference signals from the cellular base station without using motion sensing information;
receiving a downlink data beam using the selected receive antenna orientation;
determining one or more triggers for selecting a possible modification to the selected receive antenna orientation based at least in part on motion sensing information generated by the wireless device and based at least in part on determining that the selected receive antenna orientation selection does not meet one or more receive antenna orientation selection conditions;
detecting a trigger for selecting a possible modification to the receive antenna orientation;
selecting the possible modification to the receive antenna orientation based at least in part on an estimated rotation of the wireless device relative to a previous position of the wireless device, wherein selecting the possible modification to the receive antenna orientation is performed based at least in part on detecting the trigger for selecting the possible modification to the receive antenna orientation;
determining whether the possible modification to the receive antenna orientation improves downlink data beam reception; and
determining whether to modify the receive antenna orientation for the cellular link in accordance with the possible modification to the receive antenna orientation based at least in part on whether the possible modification to the receive antenna orientation improves downlink data beam reception.

2. The method of claim 1, wherein the method further comprises:
determining to not modify the receive antenna orientation for the cellular link if it is determined that the possible modification to the receive antenna orientation does not improve downlink data beam reception; and
determining to modify the receive antenna orientation for the cellular link if it is determined that the possible modification to the receive antenna orientation improves downlink data beam reception.

3. The method of claim 1, wherein the one or more receive antenna orientation selection conditions comprise:
receive antenna orientation selection using reference signals from the cellular base station without motion sensing information resulting in a same receive antenna orientation being selected for at least a certain number of measurements.

4. The method of claim 1, wherein said selecting the possible modification to the receive antenna orientation is further in response to one or more of:
  detection of the wireless device rotating by an amount greater than a rotation threshold; or
  detection of an amount of time having elapsed since a previous trigger for selecting a possible modification to the receive antenna orientation that is greater than a time threshold.

5. The method of claim 1, wherein the method further comprises:
  determining a current orientation range of the wireless device from at least a first orientation range and a second orientation range; and
  performing a beam search based at least in part on measurement data from a measurement table associated with the current orientation range of the wireless device.

6. The method of claim 1, wherein the method further comprises:
  determining an orientation of the wireless device;
  determining that one or more antenna panels of the wireless device are currently azimuth panels and that one or more antenna panels of the wireless device are currently elevation panels; and
  performing a beam search, wherein beam tracking on the azimuth panels is prioritized in the beam search.

7. The method of claim 1, wherein the one or more receive antenna orientation selection conditions comprise:
  a signal strength value for a synchronization signal from the cellular base station differing from a signal strength value of a data channel from the cellular base station by less than a difference threshold for at least a certain number of measurements.

8. An apparatus, comprising:
  a processor configured to cause a wireless device to:
    establish a cellular link with a cellular base station;
    select a receive beam configuration for the cellular link including a selected receive antenna orientation of the wireless device, the selection comprising performing receive antenna orientation selection using reference signals from the cellular base station without motion sensing information;
    receive a downlink data beam using the selected receive antenna orientation;
    determine one or more triggers for selecting a possible modification to the selected receive antenna orientation based at least in part on motion sensing information generated by the wireless device and based at least in part on determining that the selected receive antenna orientation selection does not meet one or more receive antenna orientation selection conditions;
    detect a trigger for selecting a possible modification to the receive antenna orientation;
    select the possible modification to the receive antenna orientation based at least in part on an estimated rotation of the wireless device relative to a previous position of the wireless device, wherein selecting the possible modification to the receive antenna orientation is performed based at least in part on detecting the trigger for selecting the possible modification to the receive antenna orientation;
    determine whether the possible modification to the receive antenna orientation improves downlink data beam reception; and
    determine whether to modify the receive antenna orientation for the cellular link in accordance with the possible modification to the receive antenna orientation based at least in part on whether the possible modification to the receive antenna orientation improves downlink data beam reception.

9. The apparatus of claim 8, wherein the processor is further configured to cause the wireless device to:
  determine to not modify the receive antenna orientation for the cellular link if it is determined that the possible modification to the receive antenna orientation does not improve downlink data beam reception; and
  determine to modify the receive antenna orientation for the cellular link if it is determined that the possible modification to the receive antenna orientation improves downlink data beam reception.

10. The apparatus of claim 8, wherein the one or more receive antenna orientation selection conditions comprise:
  receive antenna orientation selection using reference signals from the cellular base station without motion sensing information resulting in a same receive antenna orientation being selected for at least a certain number of measurements.

11. The apparatus of claim 8, wherein said selecting the possible modification to the receive antenna orientation is further in response to one or more of:
  detection of the wireless device rotating by an amount greater than a rotation threshold; or
  detection of an amount of time having elapsed since a previous trigger for selecting a possible modification to the receive antenna orientation that is greater than a time threshold.

12. The apparatus of claim 8, wherein the processor is further configured to cause the wireless device to:
  determine a current orientation range of the wireless device from at least a first orientation range and a second orientation range; and
  perform a beam search based at least in part on measurement data from a measurement table associated with the current orientation range of the wireless device.

13. The apparatus of claim 8, wherein the processor is further configured to cause the wireless device to:
  determine an orientation of the wireless device;
  determine that one or more antenna panels of the wireless device are currently azimuth panels and that one or more antenna panels of the wireless device are currently elevation panels; and
  perform a beam search, wherein beam tracking on the azimuth panels is prioritized in the beam search.

14. The apparatus of claim 8, wherein the one or more receive antenna orientation selection conditions comprise:
  a signal strength value for a synchronization signal from the cellular base station differing from a signal strength value of a data channel from the cellular base station by less than a difference threshold for at least a certain number of measurements.

15. A wireless device, comprising:
  a radio; and
  a processor operably coupled to the radio and configured to cause the wireless device to:
    establish a cellular link with a cellular base station;
    select a receive beam configuration for the cellular link including a selected receive antenna orientation of the wireless device, the selection comprising performing receive antenna orientation selection using reference signals from the cellular base station without motion sensing information;

receive a downlink data beam using the selected receive antenna orientation;

determine one or more triggers for selecting a possible modification to the selected receive antenna orientation based at least in part on motion sensing information generated by the wireless device and based at least in part on determining that the selected receive antenna orientation selection does not meet one or more receive antenna orientation selection conditions;

detect a trigger for selecting a possible modification to the receive antenna orientation;

select the possible modification to the receive antenna orientation based at least in part on an estimated rotation of the wireless device relative to a previous position of the wireless device, wherein selecting the possible modification to the receive antenna orientation is performed based at least in part on detecting the trigger for selecting the possible modification to the receive antenna orientation;

determine whether the possible modification to the receive antenna orientation improves downlink data beam reception; and determine whether to modify the receive antenna orientation for the cellular link in accordance with the possible modification to the receive antenna orientation based at least in part on whether the possible modification to the receive antenna orientation improves downlink data beam reception.

16. The wireless device of claim 15, wherein the processor is further configured to cause the wireless device to:

determine to not modify the receive antenna orientation for the cellular link if it is determined that the possible modification to the receive antenna orientation does not improve downlink data beam reception; and determine to modify the receive antenna orientation for the cellular link if it is determined that the possible modification to the receive antenna orientation improves downlink data beam reception.

17. The wireless device of claim 15, wherein the one or more receive antenna orientation selection conditions comprise:

receive antenna orientation selection using reference signals from the cellular base station without motion sensing information resulting in a same receive antenna orientation being selected for at least a certain number of measurements.

18. The wireless device of claim 15, wherein said selecting the possible modification to the receive antenna orientation is further in response to one or more of:

detection of the wireless device rotating by an amount greater than a rotation threshold; or detection of an amount of time having elapsed since a previous trigger for selecting a possible modification to the receive antenna orientation that is greater than a time threshold.

19. The wireless device of claim 15, wherein the processor is further configured to cause the wireless device to:

determine a current orientation range of the wireless device from at least a first orientation range and a second orientation range; and perform a beam search based at least in part on measurement data from a measurement table associated with the current orientation range of the wireless device.

20. The wireless device of claim 15, wherein the processor is further configured to cause the wireless device to:

determine an orientation of the wireless device;

determine that one or more antenna panels of the wireless device are currently azimuth panels and that one or more antenna panels of the wireless device are currently elevation panels; and perform a beam search, wherein beam tracking on the azimuth panels is prioritized in the beam search.

* * * * *